United States Patent
Fuerst et al.

(10) Patent No.: US 12,061,961 B2
(45) Date of Patent: Aug. 13, 2024

(54) AUTOMATED KNOWLEDGE INFUSION FOR ROBUST AND TRANSFERABLE MACHINE LEARNING

(71) Applicant: NEC Laboratories Europe GmbH, Heidelberg (DE)

(72) Inventors: Jonathan Fuerst, Heidelberg (DE); Mauricio Fadel Argerich, Heidelberg (DE); Bin Cheng, Sandhausen (DE)

(73) Assignee: NEC CORPORATION, Tokyo (JP)

( * ) Notice: Subject to any disclaimer, the term of this patent is extended or adjusted under 35 U.S.C. 154(b) by 989 days.

(21) Appl. No.: 17/035,967

(22) Filed: Sep. 29, 2020

(65) Prior Publication Data

US 2021/0357767 A1 Nov. 18, 2021

(30) Foreign Application Priority Data

May 15, 2020 (EP) .................................... 20175090

(51) Int. Cl.
- *G06N 20/20* (2019.01)
- *G06F 18/25* (2023.01)
- *G06N 5/02* (2023.01)

(52) U.S. Cl.
CPC ............ *G06N 20/20* (2019.01); *G06F 18/25* (2023.01); *G06N 5/02* (2013.01)

(58) Field of Classification Search
CPC .......... G06N 20/20; G06N 5/02; G06F 18/25
See application file for complete search history.

(56) References Cited

U.S. PATENT DOCUMENTS

| | | | |
|---|---|---|---|
| 7,804,999 B2 | 9/2010 | Zhou et al. | |
| 2004/0223567 A1 | 11/2004 | Liu | |
| 2009/0234720 A1 | 9/2009 | George et al. | |
| 2017/0230410 A1* | 8/2017 | Hassanzadeh | G06N 20/00 |
| 2020/0133255 A1 | 4/2020 | Cella et al. | |
| 2021/0279615 A1* | 9/2021 | Latapie | G06N 5/022 |

FOREIGN PATENT DOCUMENTS

WO 2015058044 A1 4/2015

OTHER PUBLICATIONS

Kursuncu, Ugur, Manas Gaur, and Amit Sheth. "Knowledge infused learning (k-il): Towards deep incorporation of knowledge in deep learning." arXiv preprint arXiv:1912.00512 (2019). (Year: 2019).*

Mirshekari, Mostafa et al. "Human gait monitoring using footstep-induced floor vibrations across different structures." UbiComp/ISWC'18, Singapore, Singapore, Oct. 2018.

Sharir, Or et al. "The Cost of Training NLP Models: A Concise Overview," arXiv:2004.08900v1, Apr. 19, 2020.

(Continued)

*Primary Examiner* — Eric Nilsson
(74) *Attorney, Agent, or Firm* — Leydig, Voit & Mayer, Ltd.

(57) ABSTRACT

A method for using knowledge infusion for robust and transferable machine learning models includes receiving a plurality of adaptive and programmable knowledge functions comprising a plurality of strong functions and a plurality of weak functions. A knowledge model is generated based on the plurality of strong functions and the plurality of weak functions. A machine learning model is trained based on the generated knowledge model.

18 Claims, 12 Drawing Sheets

(56) References Cited

OTHER PUBLICATIONS

Wabersich, Kim P et al. "Probabilistic model predictive safety certification for learning-based control." arXiv:1906.10417v1, Jun. 25, 2019.

Ratner, Alexander et al. "Snorkel: Rapid training data creation with weak supervision," The VLDB Journal 29.2 (2020): 709-730, Jul. 15, 2019.

Schmidhuber, Jürgen, "Deep learning in neural networks: An overview," arXiv:1404.7828v4, Oct. 8, 2014.

ETSI GS CIM 009: "Context Information Management (CIM); NGSI-LD API," V1.2.1, Oct. 2019.

Kursuncu, Ugur et al. "Knowledge Infused Learning (K-IL): Towards Deep Incorporation of Knowledge in Deep Learning," arXiv:1912.00512v2, Feb. 29, 2020.

"The Coming AI Revolution In Retail and Consumer Products," IBM Institute for Business Value in association with National Retail Federation, IBM Corporation, Jan. 2019.

Banerjee, Pratyay and Chitta Baral, "Knowledge Fusion and Semantic Knowledge Ranking for Open Domain Question Answering," arXiv:2004.03101v2, Apr. 17, 2020.

Sapra, Dolly and Andy D. Pimentel, "Deep Learning Model Reuse and Composition in Knowledge Centric Networking," ICCN, Aug. 2020.

Valiant, Leslie G., "Knowledge Infusion: In Pursuit of Robustness in Artificial Intelligence," Foundations of Software Technology and Theoretical Computer Science (Bangalore), Jan. 2008.

Islam, Sheikh Rabiul et al., "Domain Knowledge Aided Explainable Artificial Intelligence for Intrusion Detection and Response," arXiv:1911.09853v2, Feb. 22, 2020.

Xue, Gui et al. "The Gambler's Fallacy Is Associated with Weak Affective Decision Making but Strong Cognitive Ability," PLOS One, vol. 7, issue 10, Oct. 2012.

Peng, Haoruo et al. "KnowSemLM : A Knowledge Infused Semantic Language Model," Proceedings of the 23rd Conference on Computational Natural Language Learning, pp. 550-562, Hong Kong, China, Nov. 3-4, 2019.

\* cited by examiner

| Generative Model (generated Labels) | Weakly-supervised Random Forest | Fully-supervised Random Forest |
|---|---|---|
| 74.1 % | 80.2 % | 81.0 % |

FIG. 9

AUTOMATED KNOWLEDGE INFUSION FOR ROBUST AND TRANSFERABLE MACHINE LEARNING

CROSS-REFERENCE TO RELATED APPLICATION

Priority is claimed to EP Patent Application No. EP 20175090.8, filed on May 15, 2020, the entire disclosure of which is hereby incorporated by reference herein.

FIELD

The present invention relates to a method and system for automated knowledge infusion for machine learning applications.

BACKGROUND

Machine learning (ML) applications in IoT scenarios are impacted because supervision knowledge, such as labeled data for supervised learning or experience and rewards gained in reinforcement learning (RL), is scarce and expensive to obtain. For example, to perform supervised learning for ML applications, a human is typically required to manually annotate events in a data stream by observing the events in the real world. For RL, exploration is expensive. Further, when used in real world systems, RL requires actions within these real, running systems where wrong actions have real impact, cost and can even potentially cause harm to the system or its users.

In addition, the performance of trained models usually depends on specific input data and environment context. For an IoT setting, this context is heavily influenced by (1) location, (2) time and (3) data quality. For example, a supervised ML model to monitor human gait may be trained in a location with a specific structure (e.g., wood); however, when the supervised ML model is used in a different structure (e.g., concrete), it may perform poorly even though the task to be performed is the same (see, e.g., Mirshekari, Mostafa, et al., "Human gait monitoring using footstep-induced floor vibrations across different structures," Proceedings of the 2018 ACM International Joint Conference and 2018 International Symposium on Pervasive and Ubiquitous Computing and Wearable Computers (2018), which is hereby incorporated by reference herein). A RL agent trained in a simulation environment for autonomous driving, may perform poorly in the real world when new situations arise (e.g., in a situation that was not available in simulation time). These problems, among others, make it hard to achieve robust, transferable and accurate machine learning for IoT systems in practice.

Traditionally, the transferability problem was addressed through transfer learning. The aim of transfer learning is to transfer knowledge learned for one task to a related task. Transferring such knowledge is beneficial for reducing the training effort—both from a compute time and from a data collection and labeling time. For instance, state of the art models in computer vision or NLP have been trained with millions of parameters and the training compute time can costs millions of dollars for large models (see, e.g., Sharir, Or, Barak Peleg, and Yoav Shoham, "The Cost of Training NLP Models: A Concise Overview," arXiv preprint arXiv:2004.08900 (2020), which is hereby incorporated by reference herein). Transfer learning can, for example, be achieved by replacing the final layer of a large deep neural network (e.g., a model trained with millions of images for object detection) to fit the model to a new task (e.g., a more specific object recognition for a single domain, such as smart appliances in a building). Further, traditional approaches fine-tune larger models to fit to a new task (e.g., by re-training only few layers) while leaving the more task-unspecific layers of the neural network fixed (see, e.g., Schmidhuber, Jürgen, "Deep learning in neural networks: An overview," Neural networks 61 (2015): 85-117, which is hereby incorporated by reference herein).

Recently, this robustness problem was addressed in the context of safe learning systems. For example, in safe reinforcement learning, the current system state is bound to a terminal set of states, that is known to be safe (see, e.g., Wabersich, Kim P., et al, "Probabilistic model predictive safety certification for learning-based control," arXiv preprint arXiv:1906.10417 (2019), which is hereby incorporated by reference herein). Another related emerging field is trustworthy machine learning, which among others, tries to improve adversarial robustness to protect against adversaries that may fool traditional machine learning systems. Uncertainty estimations in machine learning have been addressed through Bayesian neural networks among others.

SUMMARY

In an embodiment, the present invention provides a method for using knowledge infusion for robust and transferable machine learning models. The method includes the steps of: receiving a plurality of adaptive and programmable knowledge functions comprising a plurality of strong functions and a plurality of weak functions; generating a knowledge model based on the plurality of strong functions and the plurality of weak functions; and training a machine learning model based on the generated knowledge model.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following:

FIG. 9 shows a table that summarizes results of using the generative model and the weakly and fully supervised random forests;

DETAILED DESCRIPTION

Figure 1:
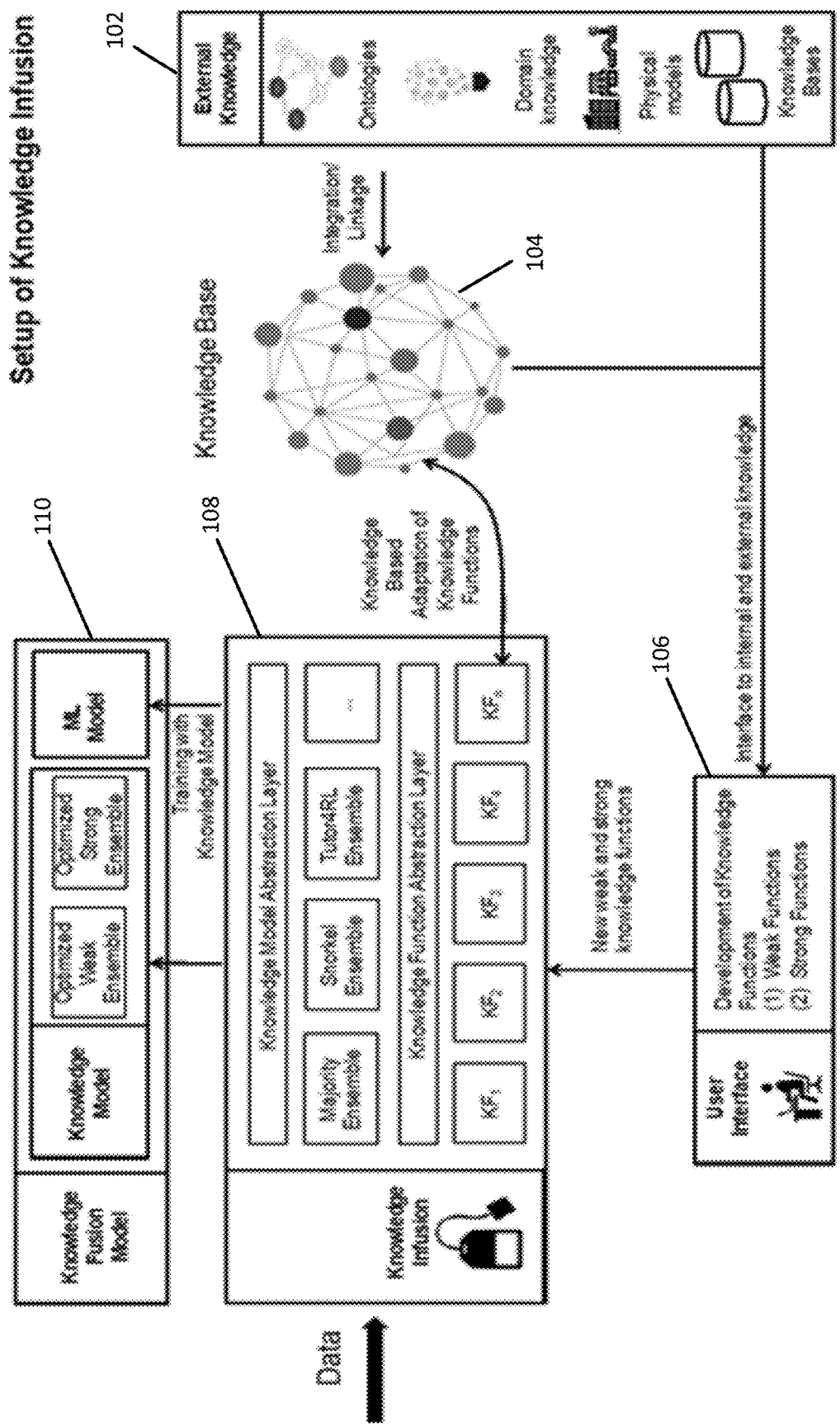
FIG. 1 schematically shows a method and system architecture for an automated knowledge infusion for robust and transferable machine learning applications during a set-up phase according to an embodiment of the present invention.

Embodiments of the present invention provide an automated knowledge infusion method and system for machine learning applications. The automated knowledge infusion method and system may be used in in internet of things (IoT) systems. The automated knowledge infusion method and system improves the robustness, transferability and accuracy of machine learning systems and applications. The method and system uses two types of knowledge functions: (a) weak knowledge functions (e.g., functions that are mostly true) and (b) strong knowledge functions that comprise axioms (e.g., canonical truths). For examples, these two functions enable the infusion of knowledge into the training phase of supervised machine learning methods through ensemble methods. Additionally, these functions act as a white box counter-part to the black-box trained model/agent of a supervised or reinforcement learning system during the execution phase that are able to (a) identify and correct (infrequent) wrong outputs of the ML model/agent (by using the set of strong knowledge functions) and (b) decide, through the calculation of uncertainty values, when a model has drifted away from the input data characteristics and must be re-trained with new data to re-gain adequate results.

Among other advantages, embodiments of the present invention uses automated knowledge infusion method and system to solve two important technical issues associated using machine learning in IoT scenarios. For example, embodiments of the present invention use weak and strong knowledge functions that include a reasoning part and a query interface to internal knowledge graphs and external knowledge sources, which enables these functions to adapt automatically based on new knowledge without any user involvement. By being able to adapt automatically, the same knowledge infusion method and system may be used across different deployments and may be updated through time. Additionally, embodiments of the present invention also addresses the robustness problem of ML systems by using the strong knowledge functions and a calculation of an uncertainty value. For instance, by using these, certain outputs are able to be guaranteed (e.g., to adhere to regulations or safety). Additionally, these further allow for the ML models to be updated when reality has drifted away from it. In contrast to transfer learning methods and methods from safe and trustworthy machine learning, the calculation of the uncertainty value based on both ML model and knowledge model is unique and unconventional, as well as simple, generally applicable and does not depend on specific model architectures (e.g., Bayesian Neural Nets).

In an embodiment, the present invention provides a method for using knowledge infusion for robust and transferable machine learning models. The method includes the steps of: receiving a plurality of adaptive and programmable knowledge functions comprising a plurality of strong functions and a plurality of weak functions; generating a knowledge model based on the plurality of strong functions and the plurality of weak functions; and training a machine learning model based on the generated knowledge model.

In an embodiment, the method further comprises: generating a knowledge fusion model based on packaging the machine learning model with the knowledge model.

In an embodiment, the method further comprises: deploying the machine learning model and the knowledge model within an environment to perform one or more operations; subsequent to deploying the machine learning model and the knowledge model within the environment, receiving new data associated with the environment from one or more sensors; inputting the new data into the machine learning model to determine one or more machine learning model outputs; inputting the new data into the knowledge model to determine one or more knowledge model outputs; and correcting the one or more machine learning model outputs based on determining the one or more machine learning model outputs contradicts the one or more knowledge model outputs.

In an embodiment, the inputting the new data into the knowledge model comprises inputting the new data into at least one of the plurality of strong functions, and wherein the one or more knowledge model outputs are outputs from the plurality of strong functions.

In an embodiment, the method further comprises: deploying the machine learning model and the knowledge model within an environment to perform one or more operations; subsequent to deploying the machine learning model and the knowledge model within the environment, receiving new data associated with the environment from one or more sensors; inputting the new data into the machine learning model to generate one or more machine learning model outputs and one or more probability values associated with the one or more machine learning model outputs; and calculating an uncertainty value based on the one or more machine learning model outputs and the one or more probability values, wherein the uncertainty value represents uncertainty of the one or more machine learning model outputs from the machine learning model.

In an embodiment, the method further comprises: comparing the uncertainty value with a threshold; and based on the uncertainty value exceeding the threshold, re-training the machine learning model.

In an embodiment, the method further comprises: based on the uncertainty value not exceeding the threshold, updating a knowledge base using the one or more machine learning model outputs; updating the knowledge model based on updating the knowledge base. The re-training of the machine learning model comprises re-training the machine learning model using the updated knowledge model.

In an embodiment, the calculating the uncertainty value comprises: determining a disagreement value between outputs from the knowledge model and outputs from the machine learning model, wherein the outputs from the machine learning model comprises the one or more machine learning model outputs; and calculating the uncertainty value based on the disagreement value and the one or more probability values.

In an embodiment, the method further comprises: determining a moving average associated with the uncertainty value; and re-training the machine learning model based on comparing the moving average associated with the uncertainty value with a threshold.

In an embodiment, the generating the knowledge model comprises generating the knowledge model based on mapping the plurality of strong functions and the plurality of weak functions using one or more ensemble methods. The one or more ensemble methods comprises at least one of a majority ensemble method, a generative ensemble method, or a Tutor for Reinforced Learning (Tutor4RL) ensemble method.

In an embodiment, the receiving the plurality of adaptive and programmable knowledge functions comprises receiving the plurality of adaptive and programmable knowledge functions from a user interface. The method further comprises: updating the plurality of weak functions and the plurality of strong functions based on an internal knowledge base and one or more external knowledge sources. The generating the knowledge model is based on updating the plurality of weak functions and the plurality of strong functions.

In an embodiment, the method further comprises: subsequent to generating the knowledge model, continuously maintaining the knowledge model based on continuously querying the one or more external knowledge sources to provide and update the plurality of weak functions and the plurality of strong functions.

In an embodiment, the method further comprises: deploying the machine learning model and the knowledge model within an environment to perform one or more operations. The environment comprises an Internet of Things (IoT) system, a smart city system, a smart retail system, a building energy management system, or a data center energy management system.

In another embodiment, the present invention provides a system for using knowledge infusion for robust and transferable machine learning models. The system comprising one or more processors which, alone or in combination, are configured to provide for execution of a method comprising: receiving a plurality of adaptive and programmable knowledge functions comprising a plurality of strong functions and a plurality of weak functions; generating a knowledge model based on the plurality of strong functions and the plurality of weak functions; and training a machine learning model based on the generated knowledge model. The system may also be configured to provide for other steps of embodiments of the method.

In a further embodiment, a tangible, non-transitory computer-readable medium having instructions thereon which, upon being executed by one or more processors, alone or in combination, provide for execution of a method according to any embodiment of the present invention.

Embodiments of the present invention provide an automated knowledge infusion method and system that is different from traditional approaches. For example, in contrast to transfer learning (e.g., transferring trained knowledge to another task), the automated knowledge infusion method and system provides for knowledge infusion using adaptive weak and strong knowledge functions, which makes the training phase transferable between tasks with little effort, as the knowledge functions adapt based on the context of the task (e.g., the location where the ML model is intended to be deployed). The adaptive weak and strong knowledge functions are determined based on interfacing with a knowledge graph and external knowledge sources (e.g., other knowledge bases such as OPENSTREETMAP) in order to adapt dynamically to new contexts (e.g., a different location and time) by querying these knowledge sources. Weak knowledge functions may include mostly true and strong knowledge functions may include axioms (canonical truths). After determining these knowledge functions, the automated knowledge infusion method and system may combine these knowledge functions into a weak ensemble and a strong ensemble that form a "white-box" knowledge model. The knowledge model may be used to train a traditional supervised machine learning model. The white box model may be continuously updated (e.g., based on new knowledge and/or added/updated knowledge functions) to ensure robustness of the method and system during execution. Additionally, and/or alternatively, the white box model may also be used to determine when the context within the real world shifts away from the trained ML model and re-training is needed.

In some instances, transferability may be achieved through making the knowledge functions adaptive to the context of a current task. For example, they may adapt based on the location context of the current task (e.g., the knowledge functions may change their behavior when being used for a deployment in a first city (City A) as compared to a second city (City B). In some variations, knowledge functions may also be stored in a knowledge base (described below) in order to facilitate their sharing/transferability. In some examples, a user (e.g., ML developer) may chose/design a selection of fitting knowledge functions (e.g., strong/weak knowledge functions). Then, the same set of knowledge functions may be used for different deployments of the same application (e.g., in different cities such as City A and City B). Additionally, and/or alternatively, based on the input data (e.g., internet of things (IoT) data, sensor data, and so on) being modeled in a standard, compliant way, a computing device may automatically select fitting knowledge functions without the user input. In other words, the computing device may select a set of knowledge functions based on the input data.

In some instances, a user may prove input to categorize whether a function is strong or weak (e.g., by using a decorator such as "@strong" or "@weak"). The user may further use external knowledge sources in the same way to classify strong or weak functions. Additionally, and/or alternatively, based on the knowledge source (e.g., the quality/quality of information from the knowledge source), a computing device may automatically determine whether the functions are weak/strong without user input or with minimal user input/direction.

Embodiments of the present invention may be applied to achieve technological improvements in a number of technological fields. For example:

Smart city analytics and control (actuation). Cities are increasingly becoming "smart" based on connecting heterogeneous sensing and actuating infrastructure through smart city platforms. The key purpose of such platforms is processing sensor data and using machine learning supported processing pipelines to improve certain aspects of a city (e.g., traffic, air quality, life quality, waste reduction, and so on) in an informed manner. To implement this, the automated knowledge infusion method and system may be used to (1) build these pipelines efficiently, (2) enable a transfer of pipelines between cities and automatically adapt them based on the context provided through the queried knowledge (for example adapt models based on knowledge of speed limits and public transport stops) and (3) achieve robust ML systems such that classification and action may be directly applied through actuations in the city (e.g., to traffic lights, smart parking or to guide public transport planning).

Smart retail prediction systems. The retail sector is increasingly using machine learning to optimize their stock to fit the expected customers' purchases. Embodiments of the present invention enable shops to develop a set of strong knowledge functions to ensure base availability of certain products or the availability of some seasonal/holiday specific products (e.g., seasonal sweets for Christmas). Such predictions might be difficult for a ML model to learn and also, seasons/holidays are different in different countries. For example, Orthodox Christmas is later than Roman-Catholic Christmas. Asian countries have different holidays than Western Countries. In such examples, knowledge functions may automatically adapt themselves by querying a knowledge base (knowledge graph) that contains these dates (e.g., Wikidata and/or an internal knowledge base) to determine the holidays for the particular locations and/or countries.

Energy management for buildings. Buildings are one of the prime consumers of energy as humans in many countries spend most of their time inside of them. Managing the energy consumption in buildings intelligently may save large amounts of energy especially for heating, ventilation and cooling (HVAC). The most advanced energy management systems for buildings apply machine learning (e.g., ML models have been controlling HVAC based on an occupancy prediction). However, commercial buildings have strong safety regulations that specify certain conditions that always need to be met (e.g., a minimum flow of ventilation). By using embodiments of the present invention, these regulations may be encoded in strong knowledge functions. The strong knowledge functions may be dynamically updated based on regulations in different states or countries through the knowledge base. The combination of the knowledge model (the combined ensemble of weak and strong knowledge functions) and ML model may safely be applied to actuate the energy management system of a building, which may ensure robustness in relation to the current regulations.

Energy management for data centers. For computation, large cloud data centers consume huge amounts of energy. The key to achieve greener data-centers may be to manage this energy consumption. To perform this, reinforcement learning (RL) may be used, which has provided some success when applied to energy management in large data centers. Embodiments of the present invention may accelerate the application of RL by providing an agent with the initial knowledge that supports the exploration of the state-action space. Embodiments of the present invention may further support the creation of strong knowledge functions that guarantee the avoidance or forces the use of some defined actions of the RL agent in certain situations, to avoid unsafe system states.

Knowledge Infusion is used to dynamically infuse knowledge (e.g., logic based on human reasoning and internal and external knowledge bases such as knowledge bases stored in a knowledge graph) into Teacher-based machine learning systems to improve overall robustness, transferability and accuracy. Teacher-based ML systems may refer to variations of supervised learning and/or reinforcement learning, where the supervision signals are gained through modeling of rewards from the environment. The infusion of this knowledge (e.g., weak and strong knowledge functions) has at least two benefits: (1) it reduces the effort needed to train or startup an ML model/agent and (2) the knowledge model may be executed side-by-side with the ML model/agent, correct wrong outputs and/or enable the calculation of an uncertainty value that gives an indication of when reality and the ML model have shifted apart so much that performance would suffer.

Infusing knowledge is performed using adaptive weak and strong knowledge functions. Knowledge functions may output a single value, which can either be a label (e.g., for supervised machine learning), an action (e.g., for reinforcement learning), and/or the functions may choose to abstain. The inputs to knowledge functions are one or multiple data points (e.g., sensor values) and one or multiple knowledge sources (e.g., an endpoint to a knowledge base). The data points may include associated context meta-data, such as the location of the sensor or the observation time. Functions include a reasoning part, defined by human provided logic (e.g., conditional operators) and input knowledge that is derived/queried from internal and external knowledge bases through well-defined interfaces (e.g., through Simple Protocol and resource description framework (RDF) query language (SPARQL), other graph query languages such as Graph query language (GraphQL), and so on). Through such well-defined interface(s), knowledge functions are practically able to adapt their behavior automatically, based on changes in the output derived from querying the knowledge bases (possibly with a different context). For example, a knowledge function that outputs if there is a fire based on the value from a temperature sensor may interface with a knowledge base that contains current weather data, including the current temperature. The reasoning logic inside the knowledge function might then use the weather temperature and the value from the temperature sensor to decide if there is a fire (e.g., the output may be a binary classification such as fire: True/False). In some embodiments, the functions may adapt to different weather conditions automatically. Additionally, and/or alternatively, through associated context meta-data of the temperature sensor, the function may adapt to different contexts, such as location and time (e.g., it will retrieve knowledge for a different location).

In some instances, the knowledge functions may choose to abstain from outputting a value when the input to the knowledge function and the external knowledge source(s) do not provide sufficient information for the specific classification task. For instance, in an embodiment of the present invention, a function may decide on the transportation mode of individuals based on sensor data collected from the individuals' mobile phones and external knowledge from an external knowledge source (e.g., OPENSTREETMAP). One function logic may vote for (e.g., determine) the transport mode to be a bus (e.g., transport_mode=BUS) in the case where there are bus stops along the global positioning system (GPS) trajectory and the speed is above a certain threshold. However, in all other cases, this function may choose to abstain because it cannot be certain about the transport mode. In such cases, a second knowledge function may use accelerometer data from the mobile phone and not abstain for the same input data.

In some variations, a user (e.g., ML developer) may input the reasoning for some retrieved external knowledge from the external knowledge source. For instance, a computing device may retrieve external knowledge from external knowledge data sources (e.g., OPENSTREETMAP). The user may provide the reasoning for the retrieved data. For example, in the fire example above, the user may input the reasoning information such as the difference between the current weather temperature and the sensor value.

Weak knowledge functions are thought to be mostly true, while strong knowledge functions include axioms (canonical truths). Embodiments of the present invention may use strong functions as a fail-safe mechanism for the ML model. In other words, strong functions may corrects outputs from the ML model that users (e.g., experts) may know as a fact, cannot be true. In the previous example regarding the fire, if temperature from the temperature sensor is within a margin of error from the weather temperature, then there is no fire. For example, the ML model may work properly most of the time. However, it could happen that a very high, unusual weather temperature is reached in a heat wave and the model incorrectly indicates that there is a fire. In such examples, the strong function may correct the output (e.g., the strong function may indicate that the weather temperature is within a margin of error and there is no fire).

In some examples, a set of both weak and strong functions is combined to label the data (each function is similar to a voter for each data point that can either vote or abstain, with the strong functions over-writing weak functions). For example, for the transportation mode example above, three weak functions may vote BUS and two weak functions may vote CAR. In such examples, the computing device may take these votes and select and choose a label (e.g., BUS because the majority (three) of the weak functions voted for it). However, if there is an additional strong function that votes BIKE, the computing device may choose BIKE instead. In other words, the strong function output of BIKE may override the weak functions outputs of CAR and BUS. The computing device may use the labeled data to train a ML model, such as neural net, random forest, and so on.

In execution, there may be two models, the black-box ML model and the white box knowledge model (based on all weak and strong functions). The computing device may use both for each new input. Traditionally, the ML model may provide a better performance because it has learned the patterns in the data and removes some noise. However, in embodiments of the present invention, the advantage of using both the ML model and the white box knowledge model is that: 1) it may correct obvious wrong outputs with the help of the strong functions; and 2) it can discover if the ML model does not fit anymore to the input data distribution. This may happen if the model is moved to a new location (e.g., City B rather than City A) or just the real world changes over time. Having just the ML model, this may be difficult to discover. Now, having the knowledge model along with the ML model, embodiments of the present invention may observe when there is too much disagreement. In this case, the computing device may re-train the ML model with the new input data distribution and labeled with the adaptive knowledge model (e.g., the knowledge model adapts automatically to a new location using OPEN-STREETMAP external knowledge).

Embodiments of the present invention create a knowledge model that includes and/or incorporates an ensemble of knowledge functions (e.g., strong and weak knowledge functions) that are used to label data points and then used to train a ML model. Additionally, and/or alternatively, in an embodiment of the present invention for RL, this step might not be needed because the agent may start interacting directly with its environment. During execution, both the knowledge model and the ML model, are then used jointly (e.g., both may be used to process every new input). FIG. 1 describes these steps in more detail.

Referring to FIG. 1, a method and system architecture 100 for setting up automated knowledge infusion for machine learning applications according to an embodiment of the present invention is shown. For example, the method and system architecture 100 may be used in in internet of things (IoT) systems. According to an embodiment of the present invention, the architecture 100 includes external knowledge sources 102 (e.g., ontologies, domain knowledge, physical models, and/or knowledge bases), a knowledge base 104, one or more user interfaces 106, a knowledge infusion device 108, and a knowledge infusion model 110. The knowledge infusion device 108 includes multiple knowledge functions (e.g., a first knowledge function ($KF_1$), a second knowledge function ($KF_2$), and so on), a knowledge function abstraction layer, multiple ensembles (e.g., majority ensemble, generative ensemble, tutor for reinforced learning (Tutor4RL), and so on), and a knowledge model abstraction layer. As shown, external knowledge sources 102 may be an application programming interface (API) such as a weather API that is directly accessed by the knowledge functions of the knowledge infusion device 108. Additionally, and/or alternatively, the external knowledge sources 102 may be a knowledge graph that integrates/links into a common knowledge base (e.g., a knowledge graph that integrates various aspects of a smart city). In some examples, the same computing device may be used for setting up the knowledge infusion model and for executing the knowledge infusion model. In other words, the same computing device may perform the functionalities of the knowledge infusion device 108 and for the knowledge infusion model 110. In other examples, different computing devices may be used for setting up and executing the knowledge infusion model. The architecture 100 will be described in further detail below.

Figure 2:
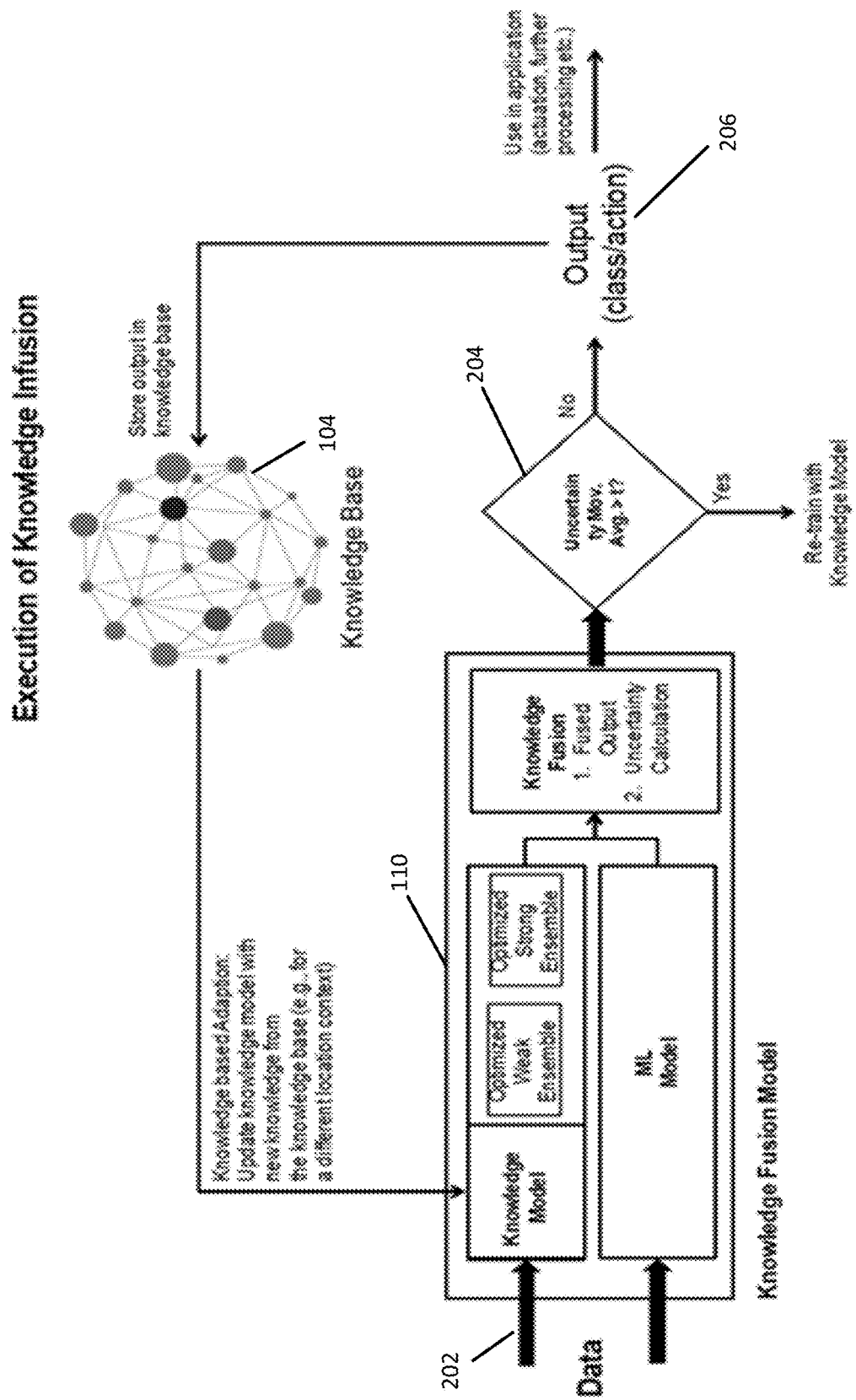
FIG. 2 schematically shows a method and system architecture for an automated knowledge infusion for robust and transferable machine learning applications during an execution phase according to an embodiment of the present invention.

FIG. 2 illustrates a method and system architecture 200 that uses the knowledge fusion model 110 (from FIG. 1) during an execution phase according to an embodiment of the present invention is shown. During the execution phase (e.g., after generating the knowledge fusion model 110 from FIG. 1), new data 202 may processed by both the ML model and the knowledge model of the knowledge fusion model 110. As described previously, the knowledge fusion model 110 permits the correction of potential wrong outputs of the ML model such that it improves overall robustness and is used to calculate an uncertainty value that enables knowledge infusion systems (e.g., systems that employ knowledge infusion) to understand if reality has drifted away from the ML model. Such uncertainty values may be calculated based on the probability values obtained from the ML model as well as the windowed disagreement between the knowledge model and the ML model (e.g., if ML model and Knowledge model disagree in 50% of all cases, this may be a strong indication for a shift). The probability values obtained from the ML model may be/include a confidence value (e.g., 0.9 or 90% confidence of the output from the ML model). However, the probability values by itself might not be a good indicator of whether the output is correct (e.g., at times, it may be tricked using adversarial inputs). As such, embodiments of the present invention may combine both the probability values and the windowed disagreement values into an uncertainty value. Then, at block 204, a moving average of this uncertainty value over a period of time may be used to decide whether the output 206 is added to the knowledge base 104 or if the ML model is re-trained using the knowledge model. In an embodiment of the present invention, the final threshold from block 204 as well as the parameter for the probability and disagreement that is used to determine the uncertainty value may be configured by a user. Because the re-training may occur with an updated knowledge model, the resulting ML model may then better fit to reality, which may result in improved performance. In some instances, the re-training may be performed by the same computing device that set up the knowledge infusion model (e.g., the computing device in FIG. 1 that set up the knowledge infusion model). Additionally, and/or alternatively, a separate computing device (e.g., a more powerful) computing device may be used for re-training the ML model.

In some embodiments of the present invention, the uncertainty value may be determined from a combination (e.g., addition) of the probability values and the windowed disagreements values. Additionally, and/or alternatively, these values may first be weighted (e.g., weigh the windowed disagreement value higher or with a stronger weight than the probability values) and then combined together. Additionally, and/or alternatively, in some instances, embodiments of the present invention may just use the windowed disagreement value to determine the uncertainty value.

The system and method architectures 100 and 200 from FIGS. 1 and 2 will be described in further detail below. For instance, to setup and execute a knowledge infusion ML method and system, the workflow may be as follows:

Step 1: Knowledge Function Development

Referring to FIG. 1, users may use the user interface 106 to develop weak and strong knowledge functions. These functions may interface with an internal knowledge base 104 (e.g., through a query language) and external knowledge sources 102 (e.g., through available APIs). Knowledge functions output a label or action based on the user provided logic and the knowledge received/queried from the knowledge base and external knowledge sources. For example, the user may define a knowledge function that outputs a transport mode for location traces based on data from an external GIS (e.g., OPENSTREETMAP) and from the user's logic (e.g., if location is on a highway, transport mode is car). Through the interface with the internal 104 and external knowledge bases 102, knowledge functions become adaptive such as by changing their behavior with a new context from the knowledge base (e.g., road has a new speed limit). In other words, the user may use the user interface 106 to provide or generate a knowledge function that outputs a label (e.g., class) or action (e.g., what should be done next). After providing the knowledge function, the user interface 106 and/or the knowledge infusion device 108 may update or adapt this knowledge function based on interfacing with (e.g., receiving information from and/or communicating with) the internal knowledge base 104 and/or the external knowledge sources 102. The knowledge infusion device 108 may store the knowledge functions.

Step 2: Knowledge Function Ensembles

The set of knowledge functions from the user interface 106 (e.g., that the user has generated) is mapped to ensemble methods in the knowledge function abstraction layer of the knowledge infusion device 108. Such ensemble methods combine multiple supervision sources into a unified model. For example, majority voting ensemble (i.e., majority ensemble) treats each supervision source equally, while other techniques, including a generative ensemble such as SNORKEL (see, e.g., Ratner, Alexander, et al., "Snorkel: Rapid training data creation with weak supervision," The VLDB Journal 29.2 (2020): 709-730, which is hereby incorporated by reference herein), model the difference in quality of different (weak) sources in a generative process that may provide improved performance. Embodiments of the present invention may be configured to use multiple and/or extensible ensemble methods. The knowledge infusion device 108 then creates two ensembles and combines them into a Knowledge Model. The two ensembles include a first ensemble that is based on the set of weak knowledge functions and a second ensemble based on the set of strong knowledge functions.

Step 3: ML Model Training

The ML model may be trained using the created knowledge model. This training may help to generalize beyond the knowledge encoded in the knowledge model by discovering new patterns in the data and removing some of the noise of the knowledge model, which increases the overall performance of the ML model as compared to the knowledge model. For instance, as described above, the knowledge functions may be combined together and used to label the data. The knowledge functions may be combined in many ways (e.g., in ensembles such as a majority ensemble). Further, due to the classification of weak and strong functions, the output of the strong functions may override the output of weak functions.

As will be explained below, for reinforcement learning, this step may be omitted because the agent may be "trained" actively through interactions with its environment. Additionally, and/or alternatively, in an embodiment of the present invention, the present invention may use the knowledge model to pre-train the RL policy instead of training it actively during runtime (e.g., execution). This will be discussed in further detail below.

Step 4: Combination of Knowledge Model and ML Model into Knowledge Fusion Model

The knowledge model and the trained ML model may be packaged into a self-contained knowledge fusion model 110. This model 110 includes a fusion component that processes the outputs of both the ML model and the knowledge model to create a single output (e.g., the strong ensemble might over-write the output of the ML model) and the logic to calculate and/or act on a configurable uncertainty value. The fusion component may be software code implemented by hardware (e.g., processor/memory of a computing device) that processes both outputs—the one from the knowledge model and the one from the ML mode. In some instances, the weak ensemble (e.g., the weak functions) might not be used to overwrite this single output, but the outputs of the weak ensemble (together with the strong ensemble) may be used to determine when the black-box ML model does not fit to reality (input data distribution) anymore based on the disagreement and probability values described above.

Step 5: Execution of Knowledge Fusion Model

Referring to FIG. 2, the knowledge fusion model 110 is deployed (e.g., in a container, or as part of an IoT cloud-edge framework) and processes new data 202. The incoming data 202 is processed by both the ML model and the knowledge model. Their output is then processed by a knowledge fusion component, which evaluates both outputs. The knowledge fusion component may overwrite outputs in which input states are covered by the strong ensemble (e.g., based on the strong knowledge functions provided initially by the user) with the outputs of the strong ensemble. This achieves robustness and helps to avoid unsafe outputs. The knowledge fusion component also outputs a calculated uncertainty value based on the outputs of the knowledge model and the ML model as well as the probability values available for ML models.

Step 6: Evaluate Uncertainty

The moving mean value of the uncertainty value may be calculated and based on a configurable threshold (e.g., user-defined threshold), embodiments of the present invention may determine one of the following decisions:

6.1 Value is Less than Threshold

If the moving mean value of the uncertainty value is less than the threshold, this may indicate that the ML model and reality (e.g., data distribution, environment properties) still match. In such examples, the knowledge base 104 may be updated with the new output from the knowledge fusion model 110. The knowledge model within the knowledge fusion model 110 may be updated using the new knowledge from the knowledge base 104 (e.g., for a different location context).

6.2 Value is Greater than Threshold

If the moving mean value of the uncertainty value is greater than the threshold, this may indicate that reality (e.g., data distribution, environment properties) may have shifted away from the ML model and the ML model might not be able to create outputs with a good performance (e.g., with sufficient accuracy). In such examples, a re-training of the ML model (for the RL agent, the RL policy may be reset) may be triggered. The re-training may occur through the continuously updated knowledge model that reflects changes in external 102 and internal knowledge bases 104 through its adaptive knowledge functions. For example, if a knowledge infusion-based ML system for transport mode detection is transferred to another environment with different characteristics, such as a different country, the knowledge model part may automatically be updated based on knowledge about speed limits and/or street and public transport characteristics (e.g., a new bus line) from a GIS knowledge base.

Additional, and/or alternative embodiments of the present invention are described below:

According to an embodiment of the present invention, the knowledge fusion model 110 for RL may be used to pre-train the RL policy rather than performing it and/or training it actively. In other words, the knowledge fusion model 110 may be used as an offline "teacher" for the RL agent in combination with already available data of states' transitions or some model of states' transitions of the RL environment and some basic reward scheme. The states' transitions may be fed to both the RL agent and the Knowledge Model and then a reward may be calculated (e.g., a conflict between the RL agent's chosen action and Knowledge Model's chosen actions may be used as a negative reward whereas agreements may be used as a positive reward for the RL agent). This process is iterated until the RL policy acquires a certain degree of agreements with the Knowledge Model such that the initial performance of the RL agent in the real environment is improved.

According to an embodiment of the present invention, the knowledge model may be executed for uncertain outputs of the ML model (based on the perceived probability). According to another embodiment of the present invention, the knowledge model may be executed for uncertain inputs (e.g., inputs that the ML model cannot clearly discriminate). For example, for inputs where the ML model is very certain, the knowledge model may agree with the ML model in most cases. As such, this embodiment may save additional computational resources.

Optimization. According to an embodiment of the present invention, the knowledge model may be updated based on batch processing instead of streaming-based processing. For instance, in steaming-based processing, the knowledge model may be updated for each new data input that is processed (e.g., a new value that is received from a sensor). However, in some embodiments, the present invention may also update the knowledge model in batches (e.g., after multiple new data input values are available). This reduces processing time. For example, the interval for new batches may either be fixed (e.g., every tenth new value) or it can be done when a threshold parameter on the probability of the ML model is reached. For instance, when uncertainty of the ML model rises, it cannot discriminate well between its output classes/actions. Through the re-creation of the knowledge model, the present invention may then verify if the ML model is to be re-trained.

Extension. According to an embodiment of the present invention, Human-In-The-Loop may be used for re-training of ML model. In some examples, it might be necessary/desired to involve a human (e.g., user operating a computing device such as user interface 106) in the re-training of the ML model to supervise the re-training and to potentially provide a small set of labelled data to verify the correct output of the knowledge model. This might be necessary if knowledge functions are not able to automatically adapt to a new context and thus their performance worsens and eventually might not be used anymore to train the ML model. In this case, a human may manually perform small tweaks to the existing functions or add/remove knowledge functions and verify the overall performance of the knowledge model using a small, labeled testing data-set.

Embodiments of Using the Knowledge Infusion System within a Smart City

Figure 3:
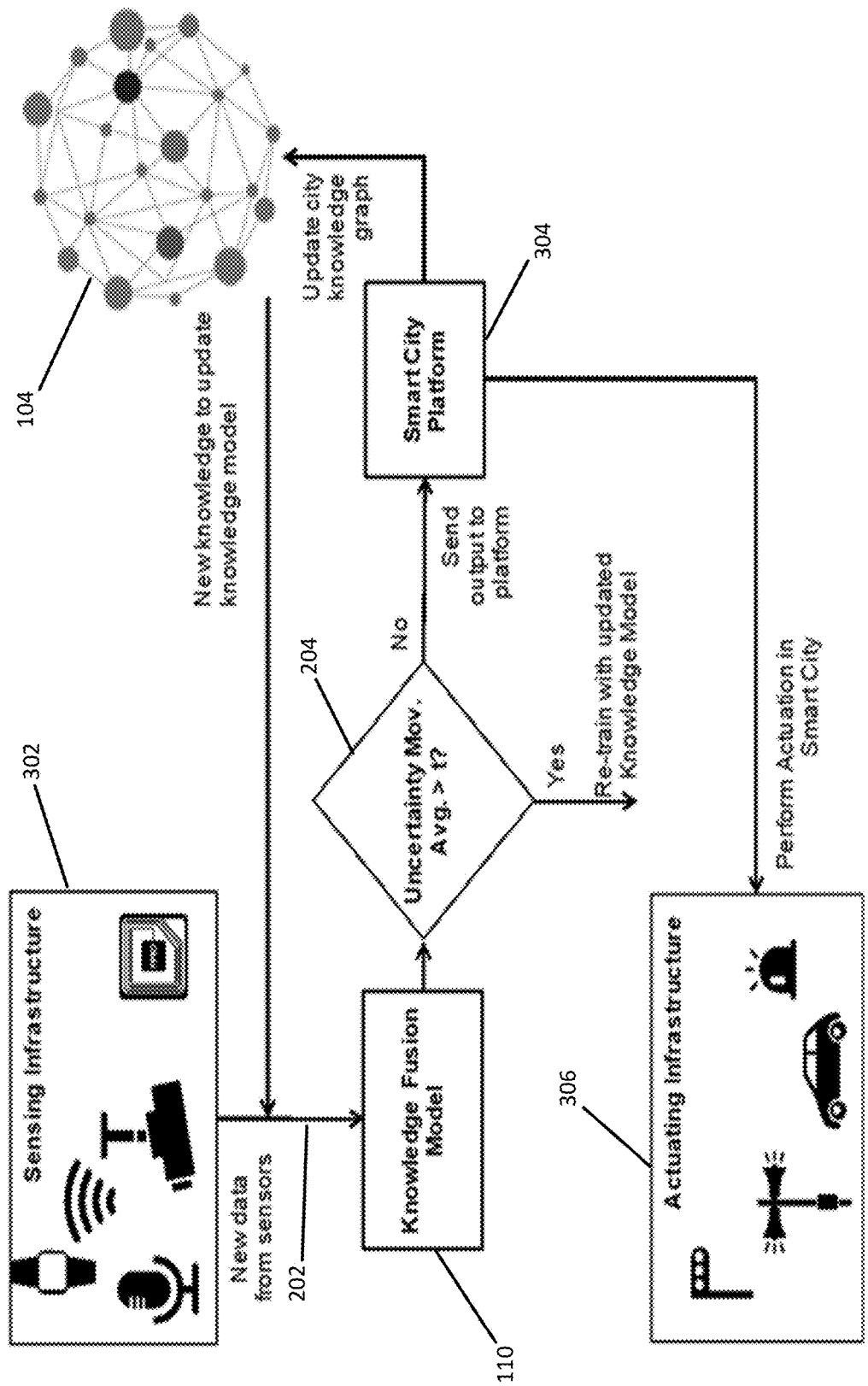
FIG. 3 shows a knowledge infusion system in the context of a smart city according to an embodiment of the present invention.

FIG. 3 illustrates an embodiment 300 of the present invention that uses a knowledge infusion system in the context of a smart city. The knowledge fusion model receives input (e.g., data 202) directly from sensors 302 (e.g., sensing infrastructure) available in the city. These sensors 302 may be either from individual wearables and smartphones and/or from infrastructure in the city, such as video cameras and environmental sensors.

New sensor data 202 will be processed by the knowledge infusion model and system 110 and based on the perceived uncertainty, will either result in a re-training of the ML model or a successful classification/action. In the successful case, the output is sent to the smart city platform 304. The city platform 304 may then perform an actuation (e.g., change the traffic light schedule) in the city using the actuating infrastructure 306 and also updates the city knowledge graph 104 with the output. The knowledge fusion model 110 may directly query the city knowledge graph for updating its state (e.g., its knowledge that is used in the knowledge functions).

Figure 4:
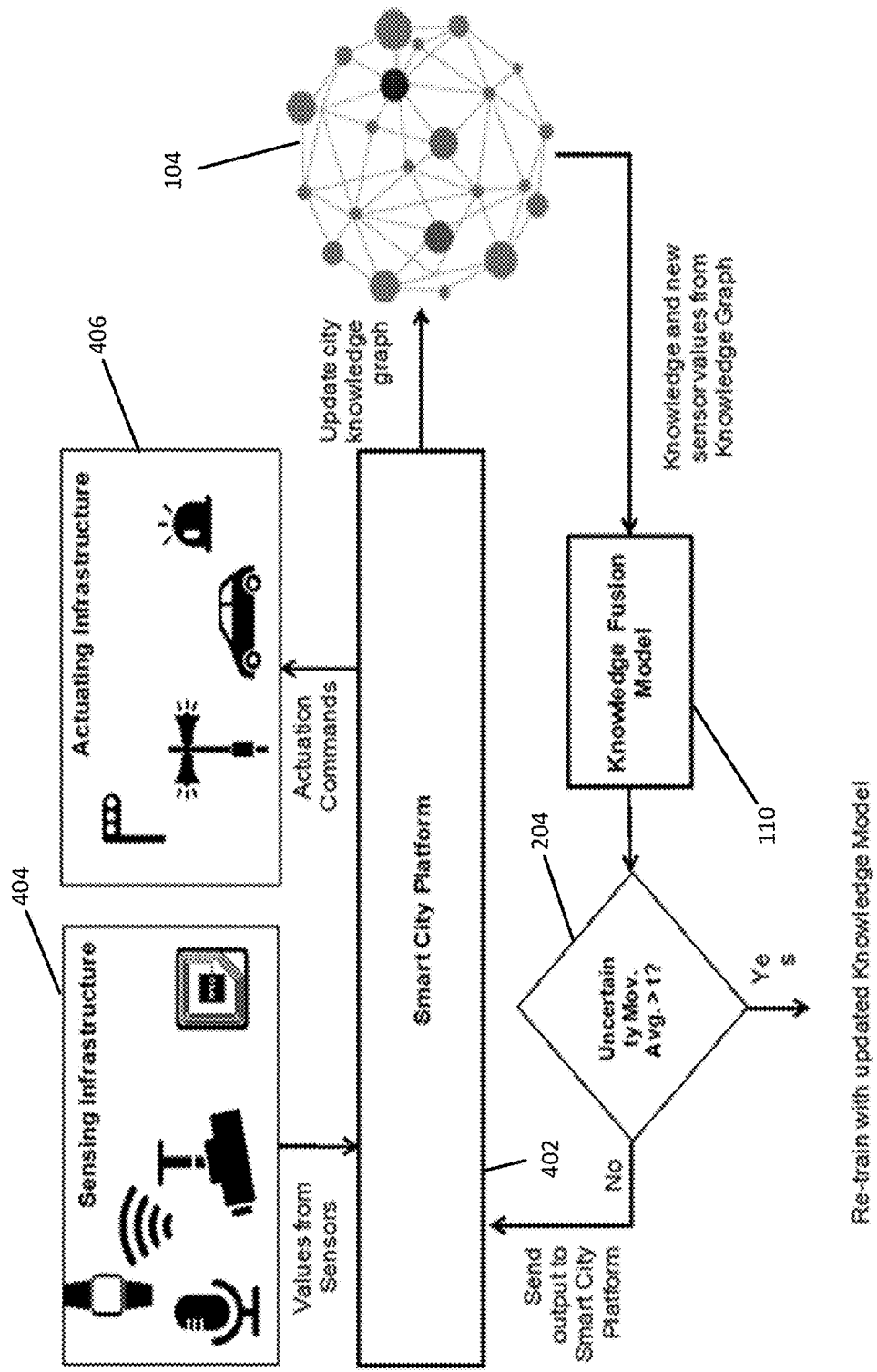
FIG. 4 shows another knowledge infusion system in the context of a smart city according to an embodiment of the present invention.

In some variations, a city sensing and actuating infrastructure may be unified and abstracted to the present invention through a smart city platform that handles accessing these sensors and actuators and makes them available through a common interface for various applications. FIG. 4 illustrates an embodiment 400 of the present invention that uses such a variation in which the city platform plays a more central role in connecting to the sensing 404 and actuating infrastructure 406 of the city. The smart city platform 402 connects to the city sensing infrastructure 404 and stores new values in the knowledge graph 104. In this embodiment, the present invention will subscribe through an available interface directly to the knowledge graph 104 to receive both: (1) New updates from sensing infrastructure 404 and (2) knowledge updates. Outputs will be sent to the city platform 402, which then performs necessary actuations using the actuating infrastructure 406 and stores the outputs in the knowledge graph 104.

Embodiments of Using the Knowledge Infusion System for Building Management

Figure 5:
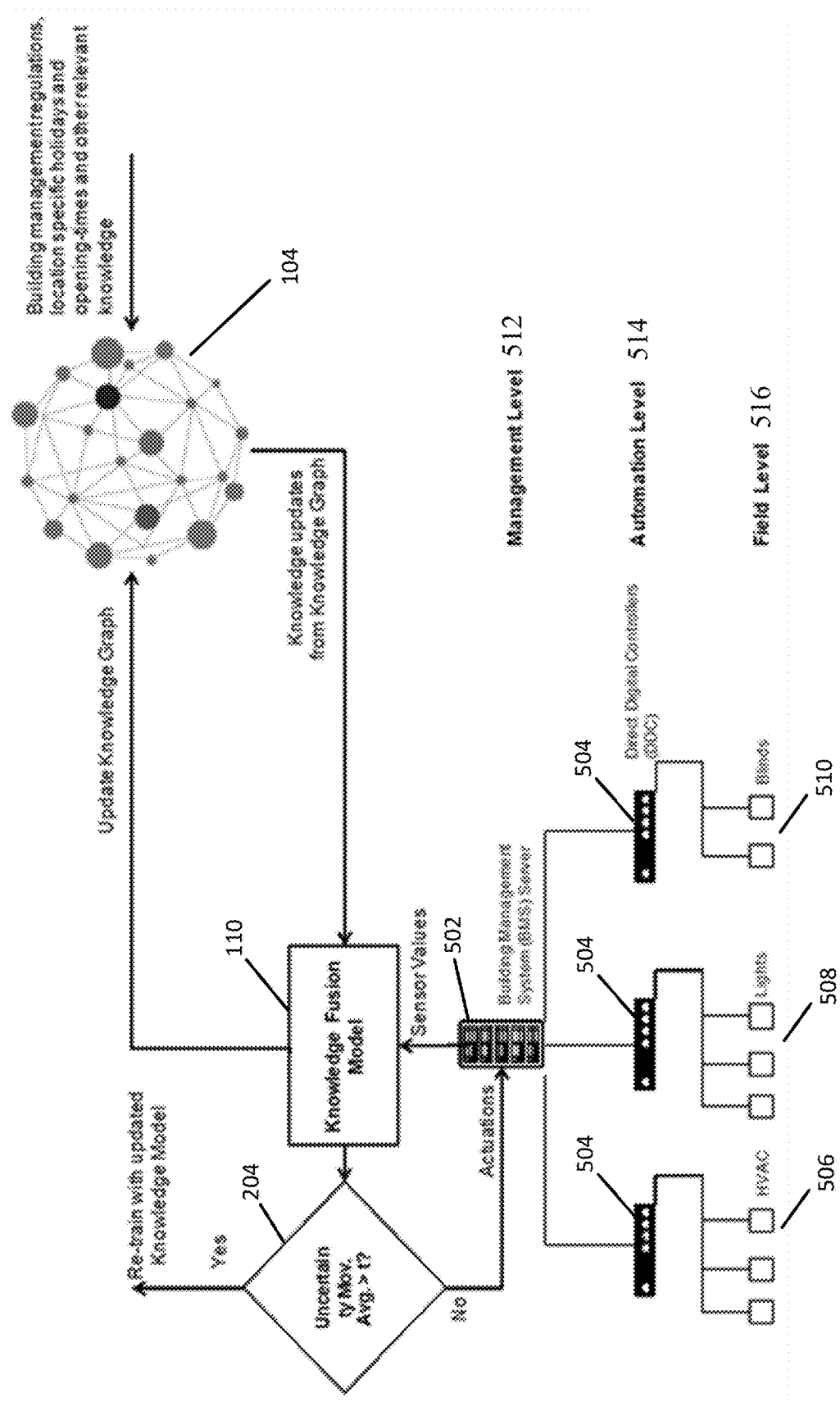
FIG. 5 shows a knowledge infusion system for building management according to an embodiment of the present invention.

FIG. 5 illustrates a knowledge infusion system 500 for Building Management according to an embodiment of the present invention. For instance, non-residential buildings usually include a Building Management System (BMS) that connects and controls building sub-systems such as lighting, heating, ventilation and air conditioning or automatic blinds. BMS consist of multiple, tightly integrated layers from management level 512 to automation 514 and field level 516. The field level 516 contains single sensors and actuators (e.g., HVAC devices 506, light devices 508, and blind devices 510). To improve building functions and reduce energy consumption, the present invention may connect to such a system through an interface to the BMS server 502 on the management level 512. The BMS server 502 may receive updates from sensor values that are then processed by the knowledge fusion model 110. In case uncertainty is below a configurable threshold, the knowledge fusion model 110 and block 504 may send actuation commands directly to the BMS server 502 that result in changed building configurations, such as HVAC setting, lighting or blinds changes.

As a BMS is usually a tightly-integrated and hard to extend system, the present invention directly updates the knowledge graph 104 with new sensing values and the outputs of the knowledge fusion model 110. Other applications and users might update the knowledge graph 104 as well. For example, there can be an interface to update building regulations, schedules and other relevant knowledge. Through these updates (and the updates in sensing and output values), the present invention is able to adapt the model automatically and ensure robustness in its output according to safety regulations.

01.02.01_60/gs_CIM009v010201p.pdf, which is hereby incorporated by reference herein).

The below example shows an instance of the present invention that uses an NGSI-LD accessible knowledge base to retrieve public weather data. The application scenario is that the user is interested in classifying two classes: "FIRE" or "NO_FIRE", based on sensed temperature values deployed inside a building. The weak knowledge function below shows an example that takes as input the sensed temperature (e.g., from sensors deployed in the building) and the knowledge source used. In this example, the endpoint is an NGSI-LD endpoint, but the present invention may support any available application programming interfaces (APIs) and query interfaces (e.g., a SPARQL endpoint or any available Web API).

Inside the function, the sensed temperature entity has multiple context/meta-data associated with it, which is unpacked in line 02-04 (the actual value, the location and the time).

The payload for the NGSI-LD interface is constructed, which will query temperature data from available weather observations in a proximity of 100 meters (m) to the sensed temperature entity.

The result is a weather temperature entity (line 16), for which is again unpacked as the actual value (line 17). Now, based on human reasoning, the conditional statement in line 19-22 returns either FIRE in case that the temperature of the building sensor is greater than the temperature of the weather observation, plus some configurable margin (line 19), or NO_FIRE, in all other cases.

```
00  @weak
01  def KF_weather_observation(sensor_temp, knowledge_source="https://my-endpoint.example"):
02      sensor_temp_value = sensor_temp["temperature"]["value"]
03      context_location = sensor_temp["location"]["value"]["coordinates"]
04      context_time = sensor_temp["dateObservedFrom"]["value"]
05      margin = 10 # 10 °C margin for temperature difference
06
07      payload = {
08          "type": "Weather",
09          "attrs": "temperature",
10          "geoproperty": "location",
11          "georel": "near;minDistance==100",
12          "geometry": "Point",
13          "coordinates": context_location,
14          "dateObservedFrom": context_time,
15      }
16      weather_temp = query_ngsi(knowledge_source, payload)
17      weather_temp_value = weather_temp["temperature"]["value"]
18
19      if sensor_temp_value > weather_temp_value + margin:
20          return FIRE
21      else:
22          return NO_FIRE
```

Embodiments of using Next Generation Service Interfaces for Linked Data (NGSI-LD) Knowledge Source for Weak and Strong Knowledge Functions for the knowledge infusion system:

NGSI-LD allows users to query knowledge sources through a standardized query interface, while using open and shared data models. It is especially popular in the context of Internet of Things systems, such as the ones seen in smart cities (see, e.g., ETSI GS CIM 009: "Context Information Management (CIM); NGSI-LD API," https://www.etsi.org/deliver/etsi_gs/CIM/001_099/009/

Below is another example that represents a basic strong knowledge function that does not require any knowledge source. The user simply has defined that when the sensed temperature is below zero degrees Celsius, there cannot be any fire (line 4-5). Note, a more sophisticated function might take the auto-ignition temperature of the material that is measured with the temperature sensor from a knowledge source, such as WIKIDATA and use this temperature point as a threshold in the condition. This would then potentially also enable the function to adapt to different materials.

```
01   @strong
02   def KF_sensor_temp(sensor_temp, knowledge_source=None):
03       sensor_temp_value = sensor_temp["temperature"]["value"]
04       if sensor_temp_value < 0:
05           return NO_FIRE
06       else:
07           return ABSTAIN
```

Embodiments of the present invention provide for some or all of the following improvements and advantages:
(1) A mechanism for human experts to inject adaptive supervision sources (in form of programmable weak and strong knowledge functions) and the ensemble of these sources into a knowledge model.
(2) An ensemble of "Teacher based" ML (supervised learning or RL) and the knowledge model (based on the programmable knowledge functions) to ensure robustness through the application of strong functions and to calculate an uncertainty value to decide if the ML model has become outdated/obsolete.
(3) Embodiments of the present invention may use a common technique to improve many issues in IoT scenarios. For instance, the weak and strong knowledge functions may include a reasoning part and a query interface to the in internal knowledge graph and external knowledge. This may enable them to adapt automatically based on new knowledge without any human involvement. Through that, the same knowledge infusion system may be used across different deployments and it will automatically update through time. The concept of strong knowledge functions and the calculation of an uncertainty value additionally addresses the robustness problem of ML systems. Certain outputs (e.g., to adhere to regulations or safety) may be guaranteed, while being able to update the ML model when reality has drifted apart from it. The calculation of an uncertainty value based on both ML model and knowledge model is simple, generally applicable and does not depend on specific model architectures such as Bayesian Neural Nets. This makes the present invention unique from both transfer learning methods and methods from safe and trustworthy machine learning.

According to an embodiment of the present invention, a method and system for automated knowledge infusion for robust and transferable machine learning in IoT systems comprises the steps of:

The reading/execution of adaptive, programmable knowledge functions including both, strong and weak functions.

The flexible mapping of a set of knowledge functions to different ensemble methods.

The continuous maintenance of a knowledge model based on the created ensemble of weak and strong knowledge functions (that query external knowledge base/bases).

The training of a "Teacher based" machine learning model based on the created knowledge model ensemble.

In the execution phase, the real-time combination/ensemble of the knowledge model with the "Teacher based" machine learning model.

The overwrite/correction of machine learning model outputs which are in contradiction with outputs of the strong knowledge ensemble in order to improve robustness.

The calculation of an uncertainty value that represents the uncertainty of each output of the ML model.

The re-training of the ML model if accumulated uncertainty values extend a configurable threshold.

Figure 6:
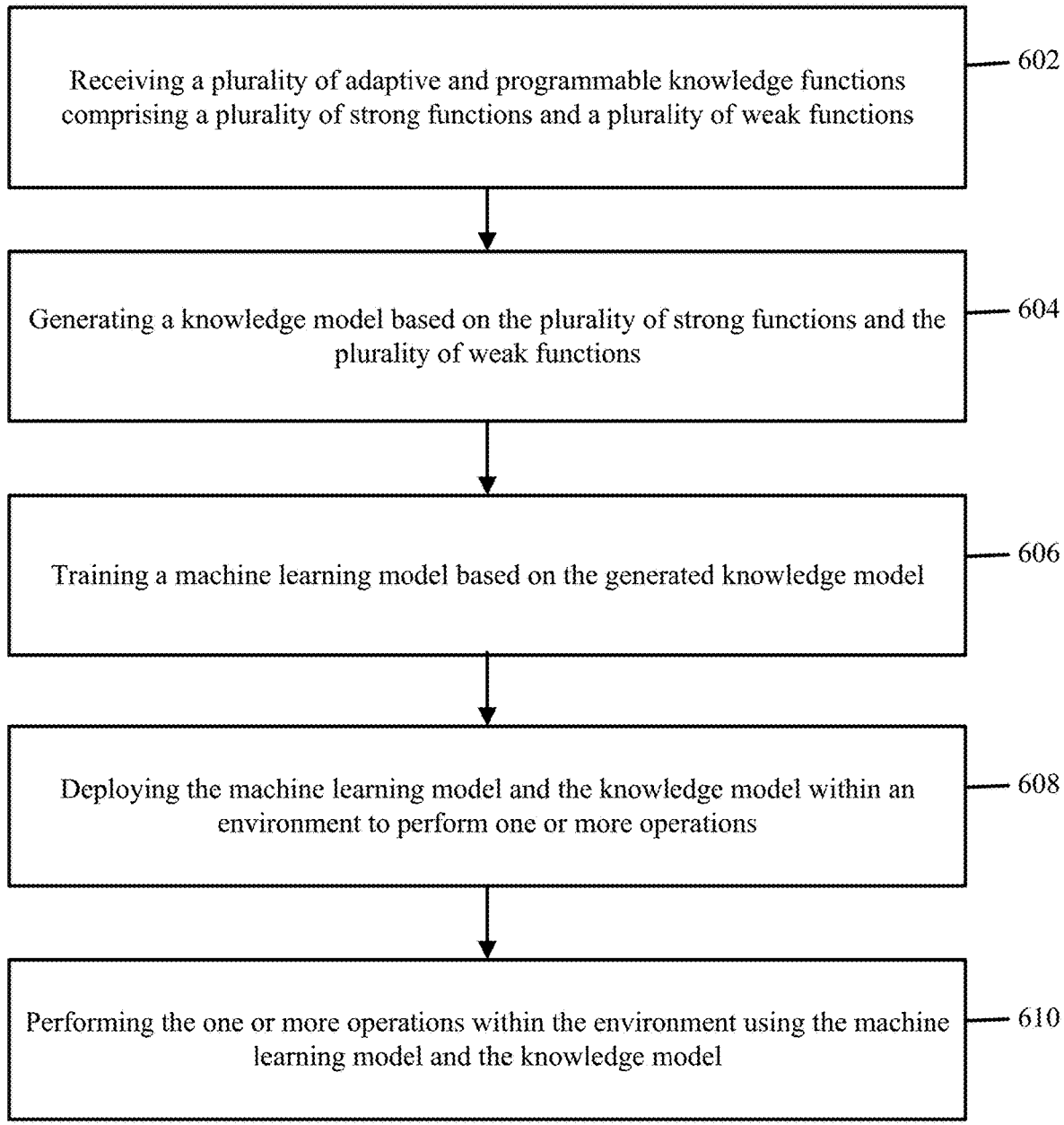
FIG. 6 shows a process for performing automated knowledge infusion for robust and transferable machine learning in IoT systems according to an embodiment of the present invention.

FIG. 6 is an exemplary process 600 for using knowledge infusion for robust and transferable machine learning models for IoT systems in accordance with one or more embodiments of the present application. The descriptions, illustrations, and processes of FIG. 6 are merely exemplary and the process 600 may use other descriptions, illustrations, and processes using knowledge infusion for robust and transferable machine learning models for IoT systems. The process 600 may be performed by one or more computing devices. The computing devices may include one or more processors and memory. The memory may store instructions that when executed by the one or more processors, are configured to perform the process 600.

In operation, at block 602, a computing device receives a plurality of adaptive and programmable knowledge functions. The knowledge functions may include a plurality of strong functions (e.g., axioms) and a plurality of weak functions (e.g., mostly true statements). For example, referring to FIG. 1, the user interface 106 may provide the plurality of adaptive and programmable knowledge functions to a computing device such as the knowledge infusion computing device 108.

According to at least one embodiment of the present invention, the computing device and/or the user interface 106 may update the knowledge functions using one or more external knowledge sources 102 and/or an internal knowledge base 104 (e.g., through a query language). The external knowledge sources 102 may include APIs (e.g., weather APIs) and/or knowledge graphs such as ontologies. The knowledge functions may output a label or action based on the user provided logic and the knowledge received/queried from the knowledge base and external knowledge sources.

At block 604, the computing device generates a knowledge model based on the plurality of strong functions and the plurality of weak functions. For example, to generate the knowledge model, the computing device may map the strong and weak functions to one or more ensemble methods (e.g. a majority ensemble method, a generative ensemble method, or a Tutor for Reinforced Learning (Tutor4RL) ensemble method).

According to at least one embodiment of the present invention, subsequent to generating the knowledge model, the computing device and/or the user interface 106 may continuously maintain the knowledge model based on continuously querying the one or more external knowledge sources 102 and/or the knowledge base 104 to provide and update the plurality of weak and strong functions. For instance, each time a pre-defined time period elapses, the computing device and/or the user interface 106 may provide a query to the external knowledge sources 102 and/or the knowledge base 104 indicating whether any knowledge functions are to be updated. Based on the query, the computing device and/or user interface 106 may receive updated information from the external knowledge sources 102 and/or the knowledge base 104 and may use the updated information to update the weak and strong functions.

At block 606, the computing device trains a machine learning model based on the generated knowledge model. For example, the computing device may use the strong and weak functions and/or ensembles to train a machine learning model. The machine learning model may be a supervised machine learning model and/or a reinforced learning (RL) model.

According to at least one embodiment of the present invention, block 606 may be performed subsequent to block

608 (e.g., deploying the machine learning model and/or the knowledge model within an environment). For instance, the machine learning model may be an RL model that may be actively trained within the environment during runtime. As such, the computing device (or another computing device) may train the RL model during runtime and after deployment. According to at least one embodiment of the present invention, the machine learning model may be an RL model and the computing device may pre-train the RL model (e.g., RL policy) prior to deployment (e.g., prior to block 608). For instance, the computing device may use the knowledge model as an offline "teacher" to train the RL model prior to deployment.

At block 608, the computing device deploys the machine learning model and the knowledge model within an environment to perform one or more operations. For instance, the computing device may package the machine learning model, the knowledge model, and/or a knowledge fusion component within a knowledge fusion model (e.g., knowledge fusion model 110). The computing device may deploy the knowledge fusion model as a container and/or as part of an IoT cloud-edge framework. As described above, the environments may include, but are not limited to, operation within a smart city (e.g., a smart city system), operation for building management (e.g., a building energy management system), operation using NGSI-LD knowledge sources, operation for a data center (e.g., a data center energy management system), and/or operation in a retail system (e.g., a smart retail system).

According to at least one embodiment of the present invention, the computing device may provide the knowledge fusion model including the machine learning model, the knowledge model, and/or the knowledge fusion component to a second computing device.

At block 610, the computing device (or the second computing device) performs the one or more operations within the environment using the machine learning model and the knowledge model. For example, subsequent to deploying the machine learning model and the knowledge model within the environment, the first or second computing device receives new data (e.g., data 202 from FIG. 2) associated with the environment from one or more sensors. The computing device may input the new data into the machine learning model and/or the knowledge model. Based on inputting the new data into the machine learning model, the computing device may determine or generate one or more machine learning model outputs and/or one or more probability values associated with the machine learning model outputs. Based on inputting the new data into the knowledge model (e.g., the strong and/or weak functions), the computing device may determine or generate one or more knowledge model outputs. The computing device may use the knowledge fusion component of the knowledge fusion model 110 to determine a fused output. For instance, based on the knowledge model outputs and the machine learning model outputs, the computing device may correct and/or overwrite the machine learning model outputs using the knowledge model outputs. For example, if the knowledge model outputs (e.g., the outputs from the strong knowledge functions) contradict the outputs from the machine learning model, the computing device may overwrite or correct the machine learning model outputs with the outputs from the strong knowledge functions. Additionally, and/or alternatively, the computing device may determine a disagreement value based on the disagreements between the knowledge and machine learning models (e.g., contradictions of outputs from knowledge model and machine learning model).

According to at least one embodiment of the present invention, the computing device (or second computing device) may determine an uncertainty value based on the one or more machine learning model outputs and/or the one or probability values. The uncertainty value represents uncertainty of the one or more machine learning model outputs from the machine learning model. Additionally, and/or alternatively, the computing device may calculate or determine the uncertainty value based on the one or more probability values and the disagreement value. For instance, as described above, the computing device may combine the disagreement value and the probability values to determine the uncertainty value.

According to at least one embodiment of the present invention, the computing device (or second computing device) may compare the uncertainty value with a threshold (e.g., as described in block 204). Based on the uncertainty value not exceeding (e.g., being less than) the threshold, the computing device may update a knowledge base 104 using the one or more machine learning model outputs. Additionally, and/or alternatively, the computing device may update the knowledge model within the knowledge fusion model 110 using the updated knowledge base 104. Based on the uncertainty value exceeding (e.g., being greater than) the threshold, the computing device may re-train the machine learning model. For instance, the computing device may re-train the machine learning model using the knowledge base 104 and/or the updated knowledge base 104 (e.g., the knowledge base 104 that has been updated with one or more outputs from the machine learning model and/or the external knowledge sources 102).

According to at least one embodiment of the present invention, the computing device that re-trains the machine learning model may be the same computing device that initially trained the machine learning model. For instance, the set-up phase (e.g., blocks 602-608) may be performed by a first computing device and the execution phase (e.g., block 610) may be performed by a second computing device. Based on the uncertainty value exceeding the threshold, the second computing device may provide instructions to the first computing to re-train the machine learning model. After re-training the machine learning model, the first device may provide the re-trained machine learning model back to the second computing device.

According to at least one embodiment of the present invention, the computing device may determine a moving average associated with the uncertainty value. In other words, the computing device may determine a plurality of uncertainty values over a period of time and determine a moving average based on the uncertainty values. The computing device may compare the moving average with a threshold to determine whether to update the knowledge base 104 with the outputs from the machine learning model or whether to re-train the machine learning model with the knowledge model.

In the following, particular embodiments of the present invention are described, along with experimental results illustrating computational improvements achieved. To some extent, the following description uses different terminology or symbols to refer to the same components or notations which are used in embodiments of the present invention described above, but would be understood by ordinarily skilled artisans as referring to the same or similar components or notations.

Machine learning (ML) applications in Internet of Things (IoT) scenarios face the issue that supervision signals, such as labeled data, may be scarce and expensive to obtain. For example, it often requires a human to manually label events in a data stream by observing the same events in the real world. In addition, the performance of trained models usually depends on a specific context: (1) location, (2) time and (3) data quality. This context is not static in reality, making it hard to achieve robust and transferable machine learning for IoT systems in practice. Below, these challenges are addressed with a Knowledge Infusion method and system. First, two past case studies were performed and discussed below in which external knowledge is combined with traditional data-driven machine learning in IoT scenarios to ease the supervision effort: (1) a weak-supervision approach for the IoT domain to auto-generate labels based on external knowledge (e.g., domain knowledge) encoded in simple labeling functions. The evaluation for transport mode classification achieves a micro-F1 score of 80.2%, with only seven labeling functions, on par with a fully supervised model that relies on hand-labeled data. (2) Guiding functions are introduced to Reinforcement Learning (RL) to guide the agents' decisions and experience. In some examples, the guided reinforcement learning achieves more than three times higher reward in the beginning of its training than an agent with no external knowledge. The lessons learned from these experiences are used to develop knowledge infusion. In knowledge infusion, the aim is to automate the inclusion of knowledge from existing knowledge bases and domain experts to combine it with traditional data-driven machine learning techniques during setup/training phase, but also during the execution phase.

Figure 7:
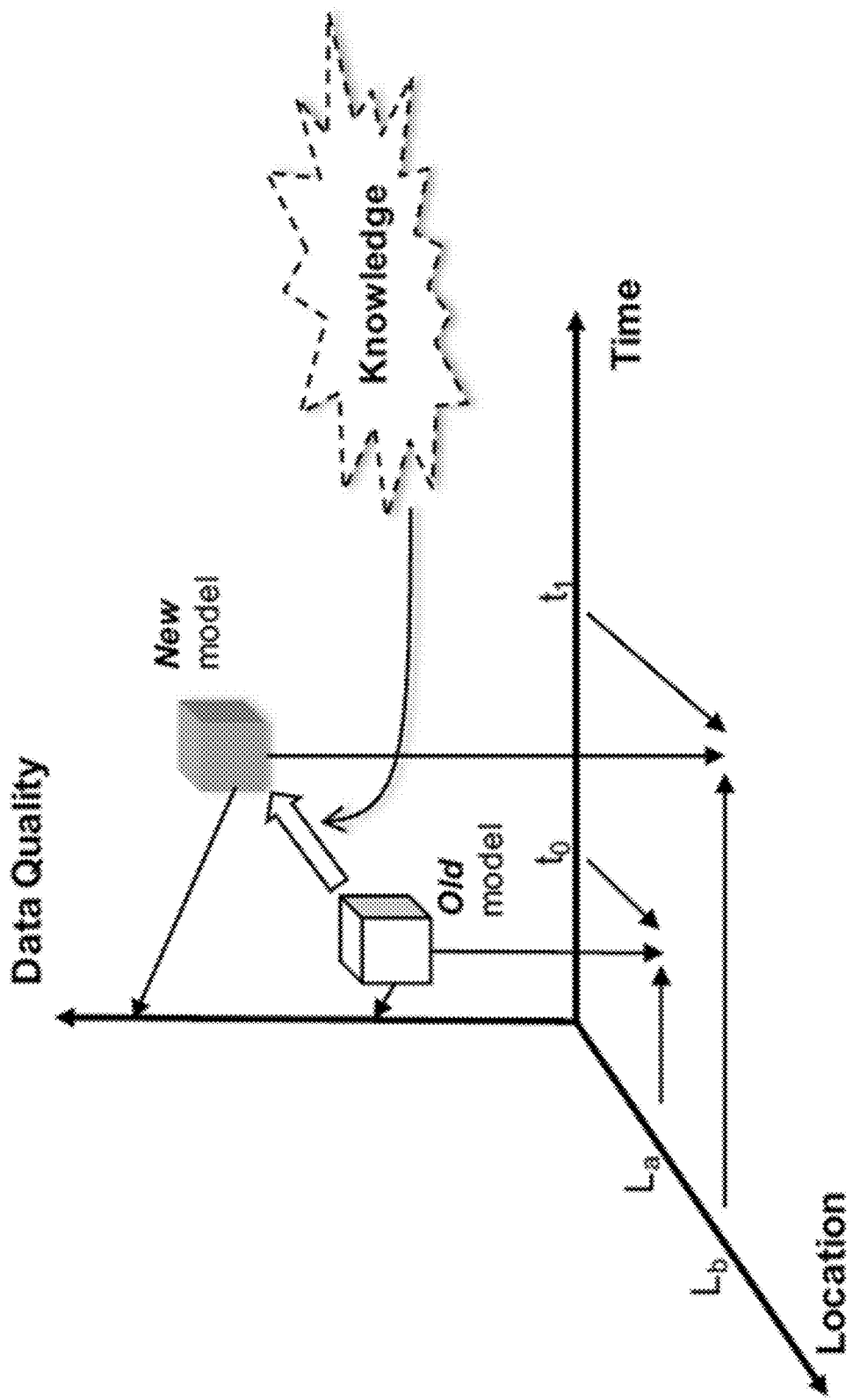
FIG. 7 graphically shows the context-dimensions of machine learning models in IoT systems.

The Internet of Things (IoT) is expanding rapidly in various sectors and applications such as smart buildings, smart cities and smart transportation. At the same time, machine learning (ML) supported systems are increasingly used to provide meaningful insights by performing classification or prediction tasks on top of IoT data and to efficiently orchestrate tasks between cloud and edge. Based on practical experience, the IoT domain poses various challenges for generalizing traditional data driven ML approaches to provide robust and transferable results. This often has to do with changes in location, time and in data quality context, which is shown in FIG. 7. In other words, FIG. 7 illustrates the context-dimensions (e.g., Time, Location, and Data Quality) of ML in IoT systems.

Location. Different locations (e.g., separate sensor deployments in a single city or deployments in multiple cities) behave differently. For example, the radio-frequency (RF) signal propagation depends heavily on the deployment location (e.g., through varying signal attenuation).

Time. Deployment characteristics as well as data patterns change through time (e.g., a ML model that works well when training data is collected such as in the lab, might degrade in performance throughout the lifetime of a deployment). Further, it is hard to quantify this degradation, because continuously obtaining ground truth data is expensive and deployment times comprise often several years.

Data Quality. In IoT deployments, data is frequently noisy, sparse and heavily imbalanced (e.g., an application might require the classification of relatively rare events such as road accidents or infrequent transport modes; a sensor network deployment might result in high variances in sampling frequency and missing data due to packet loss). As IoT devices have limited power and computation, collecting highly dense data may often be difficult.

As such, in view of the above, machine learning in the IoT domain needs to achieve robustness and transferability during setup/training as well as during execution phase in order to deal with such varying context.

Traditionally, the transferability problem has been addressed often through transfer learning, which has the aim to transfer knowledge learned for one task to a related task. The robustness problem has been recently addressed in the context of safe learning systems (see below). In the present invention, embodiments are described that use a Knowledge Infusion method to address these issues. For instance, instead of transferring trained knowledge to another task (as in transfer learning), Knowledge Infusion intends to transfer knowledge used for the training phase between tasks with little effort. This transferability is achieved through adaptive weak and strong knowledge functions that are interfacing with a knowledge graph and external knowledge sources (for example open knowledge bases such as OPENSTREET-MAP or WIKIDATA) in order to adapt dynamically to a new context by querying these knowledge sources. To achieve this, two types of knowledge functions are used: weak knowledge functions, that are thought to be mostly true and strong knowledge functions that comprise axioms (canonical truths). Then, these knowledge functions are combined into a weak ensemble and a strong ensemble that together form a "white-box" knowledge model. Next, this knowledge model is used to train any traditional supervised machine learning model (e.g., using the labels generated with the knowledge model). As has been demonstrated, the machine learning model will usually perform better than the model/ labels used for training it. The reason is that the machine learning model will learn to generalize the patterns found in the data while also partially removing noise in it.

In Knowledge Infusion, the "white-box" knowledge model is continuously updated (through new knowledge or added/updated knowledge functions) and then used to ensure robustness of the system during execution, while also identifying situations in which the context in the real world shifts away from the trained ML model and re-training is needed.

Below, two previous experiences where external knowledge is exploited in the training process is discussed: (1) In supervised machine learning for a smart mobility use case by adapting the weak-supervision framework SNORKEL to fit the IoT domain and (2) For reinforcement-learning, where external knowledge is used to guide agent exploration. These experiences and the lessons learned open up the way to the present invention. After, a discussion of related work and an outlook on additional embodiments is discussed.

Below, two previous examples are in which external knowledge is used successfully in machine learning systems in the IoT domain: (1) In supervised machine learning for transport mode detection; (2) for reinforcement-learning. The lessons learned from these examples are a starting point to develop the knowledge infusion of the present invention.

Supervised Machine Learning: Transport Mode Detection

An important application of context-aware computing is detecting transportation modes of people using mobile devices such as smartphones. Transport mode detection is a key enabler for physical activity monitoring as well as personal environmental impact monitoring. It is also critical to optimize urban multimodal human mobility and to enable end-user applications, such as automated and individual carbon dioxide ($CO_2$) emission tracking.

Transport mode detection requires a two-step segmentation of sensor data to trips and sections (based on transport modes), and an accurate classification of these sections into modes (e.g., walking, bicycling, riding a bus). Traditionally, previous examples have proposed transport mode detection using smartphone sensors such as GPS, accelerometer, barometer, or combinations of these and adding geographic information system (GIS) data to improve accuracy. Most of these examples leverage supervised ML using labeled data points as training data. This labeled data is usually provided by users/participants of the studies.

Exemplary Approach

Figure 8:
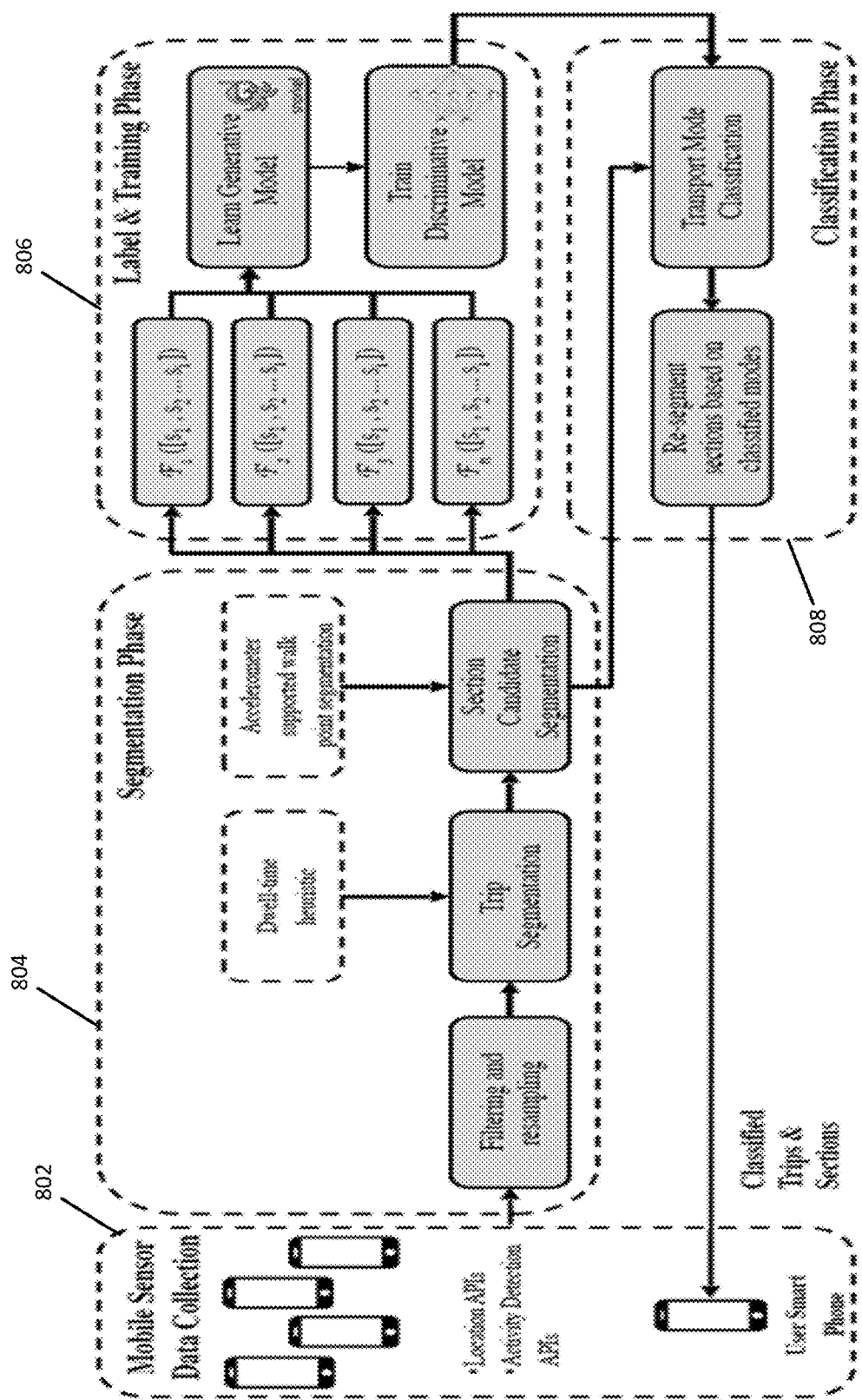
FIG. 8 shows the main building blocks used to address the transport mode detection problem.

Embodiments of the present invention address the transport mode detection problem by adopting weak supervision techniques originally used in information extraction to this problem. FIG. 8 illustrates the main building blocks used to address the transport mode detection problem according to an embodiment of the present invention. In particular, FIG. 8 shows the transport mode detection steps.

First, in the mobile sensor data collection phase 802, sensor data (location and activity data) is sensed from user smartphones. In the Segmentation Phase 804, time series from multiple sensors is aligned to the same sampling time and segment time series first into trips (by applying a dwell time heuristics) and section candidates (using a developed activity supported walk point segmentation algorithm). The outcome of this step is a set of section candidates, each candidate contains a time-series of location and activity data points.

Second, in the Label & Training Phase 806, a set of labeling functions is applied to these candidates. Each function encodes human heuristics and/or external knowledge (e.g., from OPENSTREETMAP) to "vote" on the transport class of a candidate section. The resulting label matrix is fed into the generative ensemble, which learns a generative model from all labeling functions and their votes on each candidate section, taking into account the underlying accuracy of each labeling function.

Finally, the generative model is used to label all candidate segments and train a discriminative ML model with the probabilistic labels. The ML model generalizes beyond the information encoded in the labeling functions. In the Classification Phase 808, this model is then used to classify incoming candidate section into transport modes. Based on this classification, re-segmentation is performed by merging adjacent sections of the same mode and the results (classified trips and sections) are returned to users.

Results

This method was validated against a dataset that was collected in the wild over a period of 4 months, containing 300,000 datapoints from 8 end-users. Global positioning system (GPS) location was sensed through iOS and Android Location API and accelerometer based activity data through the Activity API. Users have partially labeled data with a developed visual labeling tool. This data was used to evaluate the method of the present invention, splitting the data in training (½) and test data (½). The method classifies four transport modes: walk, bike, car and train.

Embodiments of the present invention uses seven labeling functions that combine external knowledge with sensor data to vote on the transport classification of a section. For example, functions are implemented that use the sensed speed together with human heuristics on common speeds for different modalities to vote on the transport mode (LF_median_sensed_speed and LF_quantile_sensed_speed). OPENSTREETMAP (OSM) may be integrated and used to the provided annotations of public transport stops (LF_osm). ML models may be trained using the data labeled by the generative model, oversampling underrepresented classes with synthetic minority oversampling technique (SMOTE). Several classifiers are tested, from simple linear models to neural networks, and the best performance with Random Forests (RF) was observed, achieving 80.2% in F1 score.

The results of the present invention were compared against a traditional supervised approach that uses the hand-labeled data of the training split results and results in an only marginally better F1 score of 81.0%. FIG. 9 illustrates a table 900 that summarizes the overall results (e.g., F1 scores) of generated labels and end models against hand-labeled ground truth. For instance, the F1 score for fully-supervised random forest was 81.0%. The F1 score for weakly-supervised random forest was 80.2%. The F1 score for generative model (generated labels) was 74.1%.

Reinforcement Learning: IOT-ML Pipeline Orchestration

Reinforcement Learning (RL) has been proven its ability to deal with complex problems, achieving super-human performance in some cases. However, its applicability in real-world problems is still lagging for a number of reasons, including: (1) learning on the real system from limited samples, and (2) safety constraints that should never or at least rarely be violated. Several approaches have emerged to address these problems such as (1) learning from human demonstrations or historical data, and (2) calculating uncertainty in decisions to manage safety and combinations with supervised learning and human intervention.

Traditionally, RL has been applied to computer systems tasks, such as database management system configuration or container orchestration for Big Data and IoT systems. In this domain, the traditional approaches are not applicable or are inconvenient because (1) data from the system might not be available if the system is new, and even when data is available, the system deployment, load and parameters vary, making these data partially true at best; in addition, (2) the cost of incorrect actions might be high when dealing with systems in production environments, training a supervised model might not possible for the reasons mentioned before, and the reaction of a human operator is expensive and slow to accommodate the system performance in a timely manner.

Exemplary Approach

Figure 10:
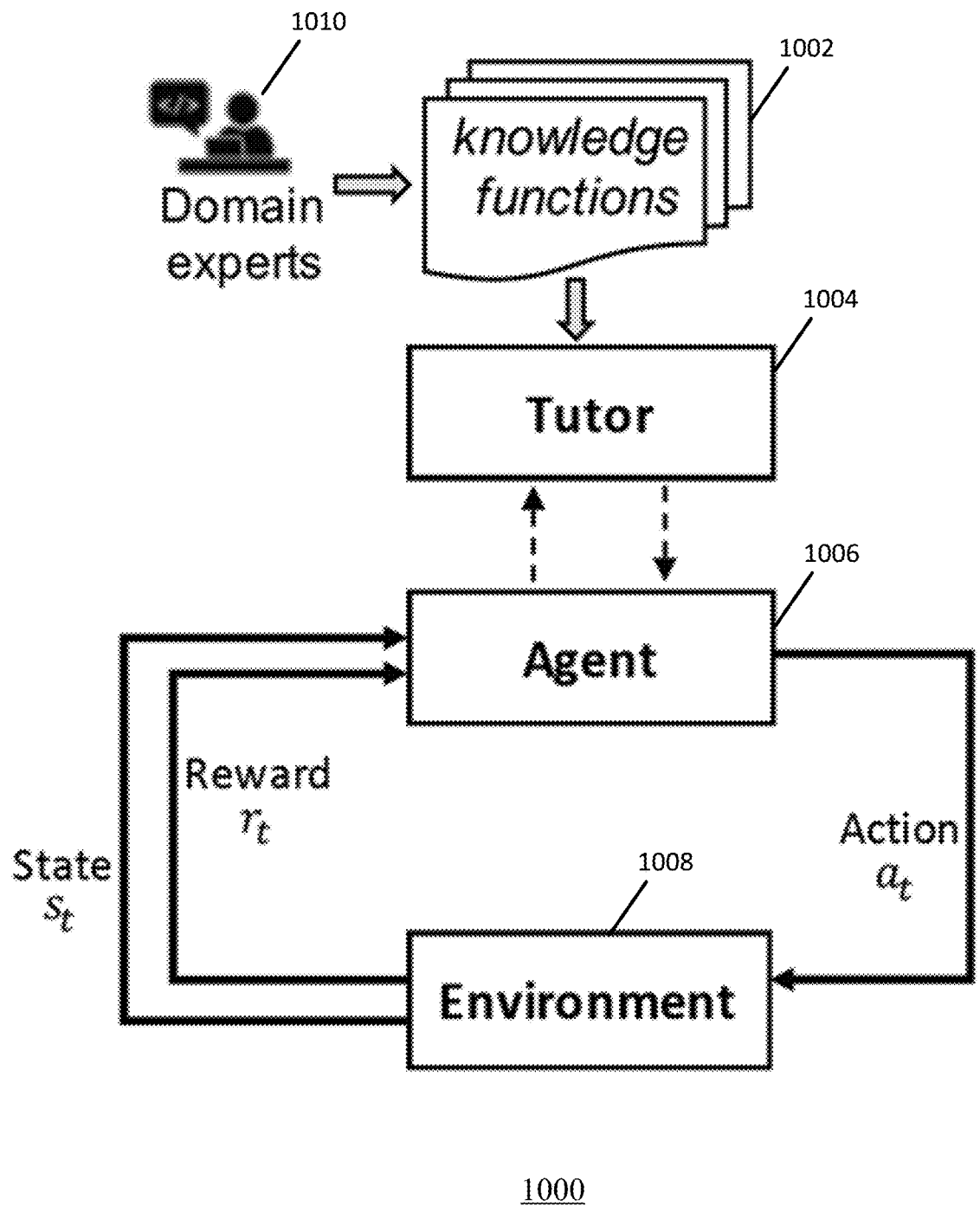
FIG. 10 shows the overall workings of a Tutor for reinforced learning (Tutor4RL) process.

To address these problems and make RL applicable to real-world problems, Tutor4RL is introduced. FIG. 10 illustrates the Tutor4RL used to address the problems addressed above to make RL applicable to real-world problems according to an embodiment of the present invention. In particular, FIG. 10 shows the overall working of the Tutor4RL.

In particular, a new component 1004 is added to the regular RL framework called Tutor 1004 to guide the agent's 1006 decisions when the agent 1006 has no or little experience. The tutor 1004 is able to guide the agent 1006 to take reasonable decisions because it can directly leverage a set of knowledge functions 1002 defined by domain experts 1004. In this way, Tutor4RL improves greatly the performance of the agent 1006 in its early phase.

The tutor 1004 possesses external knowledge and interacts with the agent 1006 during training. The tutor 1004 takes as input the state of the environment, and outputs the action to take; in a similar way to the agent's policy. However, the tutor 1004 is implemented as programmable functions, in which external knowledge is used to decide the mapping between states and actions (e.g., for ATARI Breakout, the tutor 1004 takes the frame from the video game as input, and outputs in what direction the bar should be moved). For every time step, the tutor 1004 interacts with the agent 1006 and gives advice to the agent 1006 for making better decisions, based on all provided knowledge functions 1002.

In order to decide when to use the policy's decisions or the Tutor's guides, the parameter τ is defined that assumes a value in the range (0, 1), which is linearly decreased during training. τ is a parameter of the model and the best value to initialize it depends on the use case; thus its initial value is left to be decided during implementation.

The tutor's behavior provides a guide to the agent 1006, but the agent 1006 may still improve upon it, reaching an even better performance than the one defined by experts 1010. This is achieved thanks to two mechanisms that are already present in RL: (1) empirical evaluation of decisions and (2) ϵ-greedy exploration. In (1), if the action suggested by the Tutor 1004 is incorrect (e.g., it provides a negative reward, the agent will learn that this action is wrong and should therefore, not be used for the given state). In the case the reward is positive but could still be improved, the agent 1006 may still find an action that returns a higher reward thanks to maintaining an ϵ-greedy exploration (2). However, the Tutor 1004 knowledge is used heavily in the initial phase, more than exploration, so even when an incorrect random action is chosen, the Tutor 1004 knowledge can correct this action quickly in most cases. The initial value for ϵ may be chosen according to the use case and how high is the cost of an incorrect action.

Results

In order to leverage existing methods and libraries, a well-known task in RL is chosen to evaluate the approach: ATARI games. Tutor4RL is implemented for a Deep Q-Networks (DQN) agent, one of the most popular and successful approaches to solve this kind of tasks in literature. The approach uses the DQN implementation provided in the library Keras-RL with Tensorflow and is applied to the game BREAKOUT, using OPENAI Gym. To evaluate the performance of this approach, it is compared to a regular DQN agent and the same set of parameters is used for both agents; DQN with Tutor4RL and plain DQN.

Figure 11:
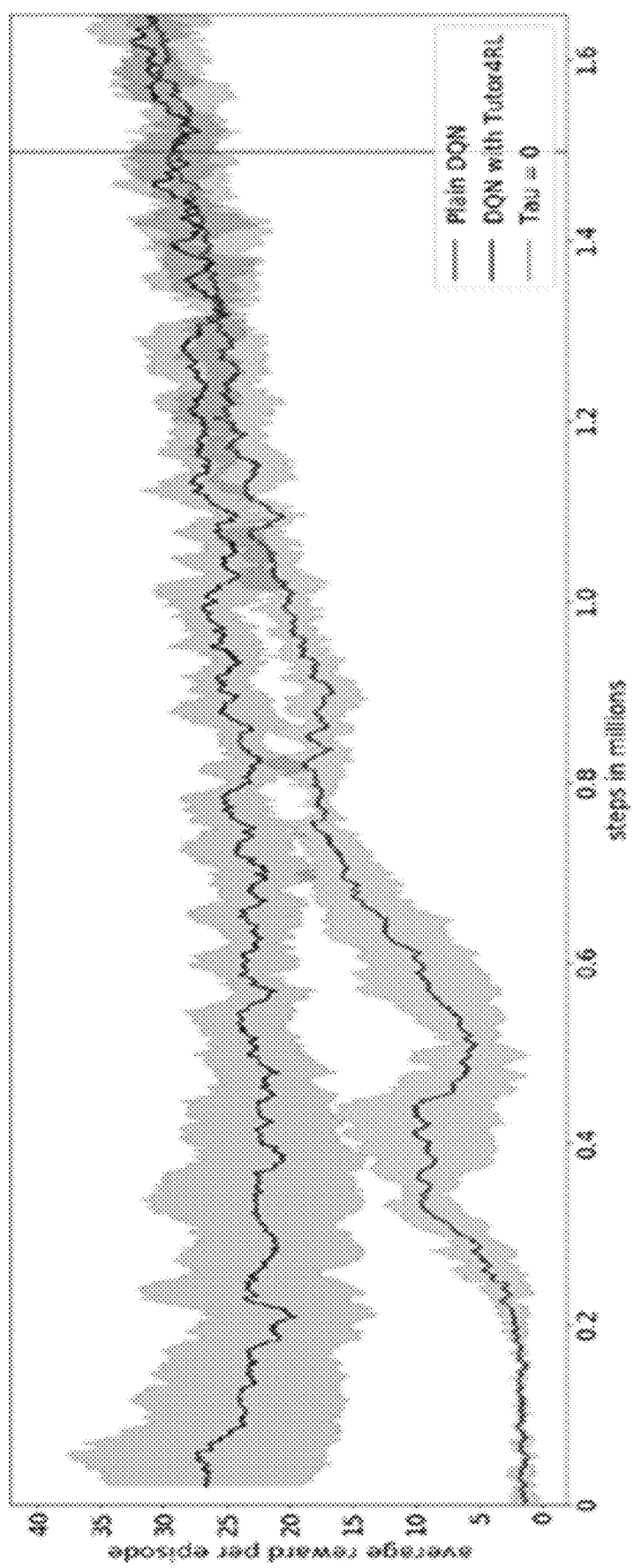
FIG. 11 shows a graphical representation the mean reward per episode of two agents.

FIG. 11 illustrates a graphical representation 1100 of the mean reward per episode of both agents during training according to an embodiment of the present invention. In particular, FIG. 11 shows an average mean reward per episode achieved by plain DQN agent and DQN agent with Tutor4RL during training. The data was averaged over 4 tests for each agent and with a rolling mean of 20 episodes, bands show 0.90 confidence interval. Until step 500,000, the plain DQN Agent shows a predictable low reward (<15 points), while the DQN Agent with Tutor4RL—thanks to the use of its tutor's knowledge—manages to achieve a mean reward between 15 and 35 points, almost double the maximum of the plain DQN Agent. From step 500,000 onwards, the plain DQN agent improves thanks to acquiring more experience, until finally in step 1.1 million (M) the plain DQN agent achieves similar results to the tutored one. From there on, a similar reward is seen for both agents, with the tutored agent achieving a slightly higher mean reward.

To evaluate the performance of the learned policy, both agents are tested after 1.75M steps with ϵ=0.05 and τ=0, so no tutor knowledge is used. The plain DQN agent is seen to achieve an average reward of 40.75 points while the agent trained with Tutor4RL achieves a reward of 43.

Additional Embodiments

Both, the experience with weak-supervision for a typical classification problem in the Internet of Things domain, as well as applying external knowledge in form of guiding functions to the reinforcement learning process have shown promising results. For transport mode detection, encoding external knowledge into seven simple functions was implemented, which potentially reduced the requirement for huge amounts of hand-labeled data in supervised learning scenarios. Bootstrapped the performance of an inexperienced agent in reinforcement learning cases was also performed through external knowledge. What is currently missing to tackle the challenges of dealing with different context in IoT are three aspects:

1. Self-adaptive functions. Functions need to become adaptive based on the current context (e.g., a function for transport mode detection needs to adapt to different locations and their context (e.g., different speed limits) automatically).

2. Notion of weak and strong functions. Often humans can easily define some conditions which they know to be true. Therefore, a notion to transfer this strong knowledge into the training and execution phase of machine learning is necessary.

3. Common method for both training and execution phase. There needs to be an ability to introduce knowledge into both the training/setup phase of machine learning, but also continuously during execution in order to ensure robustness throughout changing contexts.

Based on these lessons learned, the present invention is provided below for a knowledge infusion method that improves on these aspects.

Knowledge Infusion

Knowledge Infusion aims to dynamically infuse knowledge, i.e., logic based on human reasoning and internal and external knowledge bases (e.g., stored in a knowledge graph) into teacher-based machine learning methods (i.e., supervised learning and reinforcement learning) to improve overall robustness, transferability and accuracy. The infusion of weak and strong knowledge has two benefits: (1) it reduces the effort needed to train or startup a ML model/agent and (2) the knowledge model can be executed side-by-side with the ML model/agent to correct wrong outputs, thereby improving robustness, and enabling the calculation of an uncertainty value that gives an indication of when reality and the ML model have shifted too much apart so that performance would suffer.

Application Areas

Some important application areas that can benefit from Knowledge Infusion in the IoT domain are:

Smart city analytics and control (actuation). Cities are increasingly becoming smart, connecting heterogeneous sensing and actuating infrastructure through smart city platforms. The key promise of such platforms is to improve certain aspects of a city (e.g., traffic, air quality, life quality, waste reduction, etc.) in an informed manner, based on the processing of sensor data and the machine learning processing pipelines for this data. Knowledge infusion helps to: (1) build these pipelines efficiently; (2) enable a transfer of pipelines between cities and automatically adapt them based on the context provided through the queried knowledge (for example adapt models based on knowledge of speed limits and public transport stops); (3) achieve robust ML systems, which outputs can be directly applied through actuations in the city (e.g., to traffic lights, smart parking or to guide public transport planning).

Smart retail decisions. The retail sector is increasingly using machine learning to optimize their stock to fit the expected customers' purchases. Knowledge infusion enables shops to develop a set of strong knowledge functions to ensure base availability of certain products or the availability of some seasonal/holiday specific products (e.g., seasonal sweets for Christmas holidays). Such predictions can be hard to learn for a ML model, but further seasons/holidays are often distinct in different countries (for example, orthodox Christmas is later than roman-catholic Christmas). In such examples, knowledge functions can automatically adapt themselves by querying a knowledge base (knowledge graph) that contains the particular holiday dates (for example WIKIDATA, or an internal knowledge base).

Energy management for buildings. Buildings are one of the prime consumers of energy as humans in many countries spend most of their time inside them. Intelligently managing the energy consumption in buildings can save large amounts of energy especially for heating, ventilation and cooling (HVAC). The most advanced energy management systems for buildings have applied machine learning (for example they have been controlling HVAC based on an occupancy prediction). However, commercial buildings have strong safety regulations that specify certain conditions that always need to be met (e.g., a minimum flow of ventilation). Using the present invention, these regulations can be encoded in strong knowledge functions. They can be updated dynamically to regulations in different states or countries through the knowledge base. The combination of the knowledge model (the combined ensemble of weak and strong knowledge functions) and the ML model can safely be applied to actuate the energy management system of a building, ensuring robustness in relation to the current regulations.

In the following, the present invention is described through two steps: (1) Setup Phase and (2) Execution Phase.

Setup Phase

Knowledge is infused through adaptive weak and strong knowledge functions. Knowledge functions output a single value, which can either be a label (for supervised machine learning) or an action (for reinforcement learning). Functions consist of a reasoning part, defined by human provided logic (e.g., conditional operators) and input knowledge that is derived/queried from internal and external knowledge bases through well-defined interfaces (e.g., through SPARQL, other graph query languages such as GraphQL or IoT specific standards such as NGSI-LD). Through such well-defined interface, knowledge functions are practically able to adapt their behavior automatically, based on changes in the input derived from the knowledge bases. For example, a knowledge function that outputs if there is a fire based on values from a temperature sensor can interface with a knowledge base that contains current weather data, including the current temperature. The reasoning logic inside the knowledge function might then use the weather temperature and the value from the temperature sensor to decide if there is a fire (binary classification, fire: True/False). Such a function may adapt to different weather conditions automatically.

Weak knowledge functions are thought to be mostly true, while strong knowledge functions comprise axioms (canonical truths). Strong functions can be used as a fail-safe mechanism for the ML model, correcting outputs that experts know as a fact, cannot be true. In the previous example, it may be known that if temperature from the temperature sensor is within a margin of error from the weather temperature, then there is no fire. Even though the ML model will work correctly almost always in this case, it could happen that a very high, unusual weather temperature is reached in a hot wave and the model incorrectly indicates there is a fire. In an embodiment, the strong function will correct the output.

Figure 12:
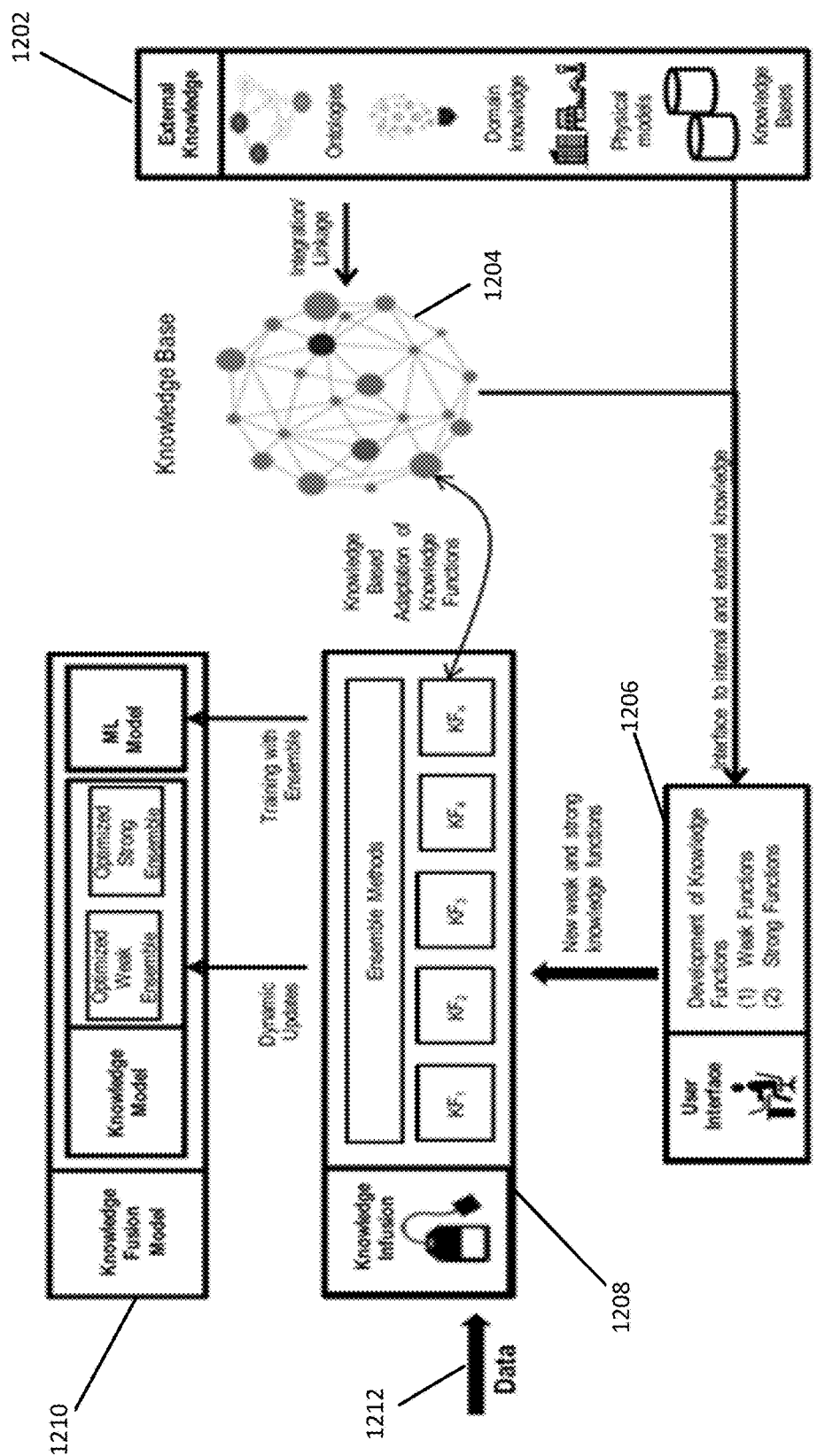
FIG. 12 shows a knowledge infusion overview and setup according to an embodiment of the present invention.

In knowledge infusion, an ensemble of these knowledge functions is created and stored into a knowledge model. The ensemble is used to label data and used to train a supervised ML model. According to an embodiment of the present invention (e.g., in RL), this step might not needed but instead, the knowledge model will guide the exploration of the agent while training its policy. During execution, both are then used jointly (e.g., both are processing every new input). FIG. 12 illustrates a knowledge infusion overview and setup. As shown, external knowledge 1202 might either be directly accessed by the knowledge functions (e.g., a weather API) or integrated/linked into a common knowledge base 1204 (e.g., a knowledge graph that integrated various aspects of a smart city).

Execution Phase

During the execution phase, new data 1212 is processed by both the ML model and the knowledge model. As described previously, the knowledge model allows for correction of some obviously wrong outputs of the ML model (improving overall robustness) and to calculate an uncertainty value that enables knowledge infusion systems to understand if the reality has drifted away from the ML model. Such uncertainty value may be calculated based on the probability values obtained from the ML model as well as the windowed disagreement between the knowledge and the ML models. A moving average of this uncertainty value is then used to decide if the output is added to the knowledge base 104 when the output is certain, or if re-training the ML model is needed. As the re-training will occur with an updated knowledge model, the resulting ML model will then better fit to reality, resulting in improved performance.

Traditional Approaches

Traditional approaches to knowledge infusion can be found in the machine learning sub domains of transfer learning, weakly-supervised learning and safe/robust or trustworthy learning.

Transfer learning, aims to transfer knowledge learned for one task to a related task. Transferring such knowledge has the benefit of reducing the training effort, both from computing time and from data collection and labeling time (state of the art models in computer vision or NLP have been trained with millions of datapoints and the training compute time can costs millions of dollars for large models). Transfer learning can, for example, be achieved by replacing the final layer of a large deep neural network (e.g., a model trained with millions of images for object detection) to fit the model to the new task (e.g., a more specific object recognition for a single domain, such as smart appliances in a building). Further, traditional approaches are fine-tuning larger models to fit to a new task, by re-training only few layers, while leaving the more task-unspecific layers of the neural network fixed. In addition, hierarchical approaches in RL aim to break down the task in sub-tasks and introduce the use of sub-policies to solve them. Once these sub-policies are trained, they can be re-used in similar tasks to the original one.

Weakly-supervised learning deals with the lack of labeled training data in machine learning systems through the use of noisy and higher-level supervision signals. With generative ensemble, a framework is proposed for weak supervision in which users, such as domain experts, write labeling functions that are then combined in a generative process. Generative ensemble such as SNORKEL has been successfully applied and adapted to tasks such as knowledge base construction from transistor data sheets, product classification up to transport mode detection.

Safe learning systems, such as safe reinforcement learning ensure that the current system state is bound to a terminal set of states that is known to be safe. Uncertainty estimates are also used to limit the risks assumed by RL agents, regulating the exploration of actions in early learning phases as well as in new situations in which the agent has not experience and is uncertain about how to act. Another related emerging field is trustworthy machine learning, which among others, tries to improve adversarial robustness to protect against adversaries which can fool traditional machine learning systems.

The present invention of knowledge infusion differs from these traditional approaches described above. Instead of transferring trained knowledge to another task (as in transfer learning), knowledge infusion intends to transfer knowledge used for the training phase between tasks with little effort. Compared to existing weak supervision approaches, the knowledge model is employed not only during the training phase, but is also used during execution. By introducing the concept of adaptive weak and strong knowledge functions, robustness during execution is provided, while also providing a trigger for a re-training of the ML model in case of a context shift. This approach was inspired by Leslie Valiant's early work on knowledge infusion. In additional embodiments of the present invention, the ideas of combining reasoning techniques with learned knowledge may be introduced to the above described knowledge infusion method.

CONCLUSION AND ADDITIONAL EMBODIMENTS

Some initial experiences in which external knowledge has been introduced to a data-driven machine learning process is provided. These experiences for supervised machine learning and reinforcement learning and the lessons learned with them open up the vision for Knowledge Infusion. Knowledge Infusion aims to improve the robustness, transferability and accuracy of machine learning in IoT systems. Towards that goal, two types of knowledge functions are proposed: (a) weak knowledge functions, that are thought to be mostly true and (b) strong knowledge functions that comprise axioms (canonical truths). The purpose of these functions is two-fold: (1) They enable the infusion of knowledge into the training phase of supervised machine learning methods through ensemble methods; (2) They act as a white box counter-part to the black-box trained model/agent of a supervised or reinforcement learning system during the execution phase that (a) can identify and correct (infrequent) wrong outputs of the ML model/agent (by using the set of strong knowledge functions) and (b) can identify through the calculation of uncertainty values when a model has drifted away from the input data characteristics and must be re-trained with new data to re-gain adequate performance.

Knowledge infusion opens up many interesting avenues for future research on how and to which to extend to combine data-driven machine learning techniques with knowledge and reasoning.

In each of the embodiments described, the embodiments may include one or more computer entities (e.g., systems, user interfaces, computing apparatus, devices, servers, special-purpose computers, smartphones, tablets or computers configured to perform functions specified herein) comprising one or more processors and memory. The processors can include one or more distinct processors, each having one or more cores, and access to memory. Each of the distinct processors can have the same or different structure. The processors can include one or more central processing units (CPUs), one or more graphics processing units (GPUs), circuitry (e.g., application specific integrated circuits (ASICs)), digital signal processors (DSPs), and the like. The processors can be mounted to a common substrate or to multiple different substrates. Processors are configured to perform a certain function, method, or operation (e.g., are configured to provide for performance of a function, method, or operation) at least when one of the one or more of the distinct processors is capable of performing operations embodying the function, method, or operation. Processors can perform operations embodying the function, method, or operation by, for example, executing code (e.g., interpreting scripts) stored on memory and/or trafficking data through one or more ASICs. Processors can be configured to perform, automatically, any and all functions, methods, and operations disclosed herein. Therefore, processors can be configured to implement any of (e.g., all) the protocols, devices, mechanisms, systems, and methods described herein. For example, when the present disclosure states that a method or device performs operation or task "X" (or that task "X" is performed), such a statement should be understood to disclose that processor is configured to perform task "X".

Each of the computer entities can include memory. Memory can include volatile memory, non-volatile memory, and any other medium capable of storing data. Each of the volatile memory, non-volatile memory, and any other type of memory can include multiple different memory devices, located at multiple distinct locations and each having a different structure. Memory can include remotely hosted (e.g., cloud) storage. Examples of memory include a non-transitory computer-readable media such as RAM, ROM, flash memory, EEPROM, any kind of optical storage disk such as a DVD, magnetic storage, holographic storage, a HDD, a SSD, any medium that can be used to store program code in the form of instructions or data structures, and the like. Any and all of the methods, functions, and operations described in the present application can be fully embodied in the form of tangible and/or non-transitory machine-readable code (e.g., interpretable scripts) saved in memory.

Each of the computer entities can include input-output devices. Input-output devices can include any component for trafficking data such as ports, antennas (i.e., transceivers), printed conductive paths, and the like. Input-output devices can enable wired communication via USB®, DisplayPort®, HDMI®, Ethernet, and the like. Input-output devices can enable electronic, optical, magnetic, and holographic, communication with suitable memory. Input-output devices can enable wireless communication via WiFi®, Bluetooth®, cellular (e.g., LTE®, CDMA®, GSM®, WiMax®, NFC®), GPS, and the like. Input-output devices can include wired and/or wireless communication pathways.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a"

or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for using knowledge infusion for robust and transferable machine learning models, the method comprising:
   receiving a plurality of adaptive and programmable knowledge functions comprising a plurality of strong functions and a plurality of weak functions, wherein the plurality of strong functions are a first set of adaptive and programmable knowledge functions that indicate canonical truths, and wherein the plurality of weak functions are a second set of adaptive and programmable knowledge functions that do not indicate the canonical truths;
   generating a knowledge model based on the plurality of strong functions and the plurality of weak functions; and
   training a machine learning model based on the generated knowledge model.

2. The method according to claim 1, further comprising generating a knowledge fusion model based on packaging the machine learning model with the knowledge model.

3. The method according to claim 1, further comprising:
   deploying the machine learning model and the knowledge model within an environment to perform one or more operations;
   subsequent to deploying the machine learning model and the knowledge model within the environment, receiving new data associated with the environment from one or more sensors;
   inputting the new data into the machine learning model to determine one or more machine learning model outputs;
   inputting the new data into the knowledge model to determine one or more knowledge model outputs; and
   correcting the one or more machine learning model outputs based on determining the one or more machine learning model outputs contradicts the one or more knowledge model outputs.

4. The method according to claim 3, wherein the inputting the new data into the knowledge model comprises inputting the new data into at least one of the plurality of strong functions, and wherein the one or more knowledge model outputs are outputs from the plurality of strong functions.

5. The method according to claim 1, further comprising:
   deploying the machine learning model and the knowledge model within an environment to perform one or more operations;
   subsequent to deploying the machine learning model and the knowledge model within the environment, receiving new data associated with the environment from one or more sensors;
   inputting the new data into the machine learning model to generate one or more machine learning model outputs and one or more probability values associated with the one or more machine learning model outputs; and
   calculating an uncertainty value based on the one or more machine learning model outputs and the one or more probability values, wherein the uncertainty value represents uncertainty of the one or more machine learning model outputs from the machine learning model.

6. The method according to claim 5, further comprising:
   comparing the uncertainty value with a threshold; and
   based on the uncertainty value exceeding the threshold, re-training the machine learning model.

7. The method according to claim 6, further comprising:
   based on the uncertainty value not exceeding the threshold, updating a knowledge base using the one or more machine learning model outputs;
   updating the knowledge model based on updating the knowledge base; and
   wherein re-training the machine learning model comprises re-training the machine learning model using the updated knowledge model.

8. The method according to claim 5, wherein calculating the uncertainty value comprises:
   determining a disagreement value between outputs from the knowledge model and outputs from the machine learning model, wherein the outputs from the machine learning model comprises the one or more machine learning model outputs; and
   calculating the uncertainty value based on the disagreement value and the one or more probability values.

9. The method according to claim 8, further comprising:
   determining a moving average associated with the uncertainty value; and
   re-training the machine learning model based on comparing the moving average associated with the uncertainty value with a threshold.

10. The method according to claim 1, wherein generating the knowledge model comprises generating the knowledge model based on mapping the plurality of strong functions and the plurality of weak functions using one or more ensemble methods, wherein the one or more ensemble methods comprises at least one of a majority ensemble method, a generative ensemble method, or a Tutor for Reinforced Learning (Tutor4RL) ensemble method.

11. The method according to claim 1, wherein receiving the plurality of adaptive and programmable knowledge functions comprises receiving the plurality of adaptive and programmable knowledge functions from a user interface, wherein the method further comprises:
   updating the plurality of weak functions and the plurality of strong functions based on an internal knowledge base and one or more external knowledge sources; and
   wherein generating the knowledge model is based on updating the plurality of weak functions and the plurality of strong functions.

12. The method according to claim 11, further comprising:
   subsequent to generating the knowledge model, continuously maintaining the knowledge model based on continuously querying the one or more external knowledge sources to provide and update the plurality of weak functions and the plurality of strong functions.

13. The method according to claim 1, further comprising:
   deploying the machine learning model and the knowledge model within an environment to perform one or more operations; and wherein the environment comprises an Internet of Things (IoT) system, a smart city system, a smart retail system, a building energy management system, or a data center energy management system.

14. The method according to claim 1, wherein receiving the plurality of adaptive and programmable knowledge functions comprises:
   receiving user input comprising:
      the plurality of adaptive and programmable knowledge functions; and
      a plurality of decorators, wherein each of the decorators indicates whether an associated adaptive and programmable knowledge functions, of the plurality of adaptive and programmable knowledge functions, is a strong function or a weak function.

15. The method according to claim 1, wherein receiving the plurality of adaptive and programmable knowledge functions comprises:
   receiving the plurality of adaptive and programmable knowledge functions from a plurality of knowledge sources, wherein each of the plurality of knowledge sources is associated with an indicator indicating whether adaptive and programmable knowledge functions, of the plurality of adaptive and programmable knowledge functions, from the knowledge source are classified as a strong function or a weak function.

16. The method according to claim 1, wherein training the machine learning model is further based on using weak supervision.

17. A system comprising one or more processors which, alone or in combination, are configured to provide for execution of a method comprising:
   receiving a plurality of adaptive and programmable knowledge functions comprising a plurality of strong functions and a plurality of weak functions, wherein the plurality of strong functions are a first set of adaptive and programmable knowledge functions that indicate canonical truths, and wherein the plurality of weak functions are a second set of adaptive and programmable knowledge functions that do not indicate the canonical truths;
   generating a knowledge model based on the plurality of strong functions and the plurality of weak functions; and
   training a machine learning model based on the generated knowledge model.

18. A tangible, non-transitory computer-readable medium having instructions thereon which, upon being executed by one or more processors, alone or in combination, provide for execution of a method comprising:
   receiving a plurality of adaptive and programmable knowledge functions comprising a plurality of strong functions and a plurality of weak functions, wherein the plurality of strong functions are a first set of adaptive and programmable knowledge functions that indicate canonical truths, and wherein the plurality of weak functions are a second set of adaptive and programmable knowledge functions that do not indicate the canonical truths;
   generating a knowledge model based on the plurality of strong functions and the plurality of weak functions; and
   training a machine learning model based on the generated knowledge model.

* * * * *